United States Patent
Kanayama

(10) Patent No.: US 9,837,856 B2
(45) Date of Patent: Dec. 5, 2017

(54) AC POWER SUPPLY SOURCE SWITCHING APPARATUS

(71) Applicant: DENSO CORPORATION, Kariya, Aichi-pref. (JP)

(72) Inventor: Mitsuhiro Kanayama, Takahama (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 430 days.

(21) Appl. No.: 14/559,089

(22) Filed: Dec. 3, 2014

(65) Prior Publication Data

US 2015/0162783 A1 Jun. 11, 2015

(30) Foreign Application Priority Data

Dec. 5, 2013 (JP) ................. 2013-252279

(51) Int. Cl.
*H02J 9/00* (2006.01)
*H02J 9/06* (2006.01)
(Continued)

(52) U.S. Cl.
CPC .......... *H02J 9/062* (2013.01); *B60L 11/1816* (2013.01); *B60L 11/1824* (2013.01); *B60L 11/1861* (2013.01); *H01H 63/36* (2013.01); *H02J 3/005* (2013.01); *B60L 2210/10* (2013.01); *B60L 2210/30* (2013.01); *B60L 2210/40* (2013.01); *B60L 2230/16* (2013.01); *B60L 2240/547* (2013.01); *B60L 2240/549* (2013.01); *B60L 2240/80* (2013.01); *Y02T 10/7005* (2013.01); *Y02T 10/705* (2013.01); *Y02T 10/7044* (2013.01); *Y02T 10/7088* (2013.01);
(Continued)

(58) Field of Classification Search
CPC ....... H02J 9/062; H02J 3/005; B60L 11/1861; B60L 11/1816; B60L 11/1824; B60L 2230/16; B60L 2240/547; B60L 2240/549; B60L 2240/80; B60L 2210/30; B60L 2210/10; B60L 2210/40; H01H 63/36; Y02T 10/7241; Y02T 10/7044; Y02T 10/7088; Y02T 10/7005; Y02T 10/705; Y02T 90/127; Y02T 10/7216; Y02T 90/163; Y02T 90/121; Y02T 90/14; Y02T 90/128; Y10T 307/625
USPC ...................................... 307/66, 80
See application file for complete search history.

(56) References Cited

U.S. PATENT DOCUMENTS

| | | | | |
|---|---|---|---|---|
| 7,345,380 B2 * | 3/2008 | Feng | ........................ | H02J 9/062 307/65 |
| 2010/0264743 A1 * | 10/2010 | Jung | ........................ | H02J 9/061 307/80 |
| 2014/0145503 A1 | 5/2014 | Kanayama | | |

FOREIGN PATENT DOCUMENTS

| JP | 2002-315193 | 10/2002 |
|---|---|---|
| JP | 2014-107882 | 6/2014 |

* cited by examiner

*Primary Examiner* — Richard Tan
(74) *Attorney, Agent, or Firm* — Harness, Dickey & Pierce, P.L.C.

(57) ABSTRACT

An AC power supply source switching apparatus includes a switch and a switch connecting a load to an AC power supply system and a DC secondary battery, respectively. When one switch, which is driven to turn off, did not actually turn off, the switch is driven to turn off again after being turned on. When an impedance of the load decreases and a load current flows in a load line, no AC voltage is developed on the load line. As a result, it is determined that (Continued)

the switch has actually turned off. Then the other switch is turned on thereby to switch over connection of the load.

12 Claims, 21 Drawing Sheets

(51) Int. Cl.
    *H01H 63/36*     (2006.01)
    *H02J 3/00*     (2006.01)
    *B60L 11/18*     (2006.01)

(52) U.S. Cl.
    CPC ........ *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y10T 307/625* (2015.04)

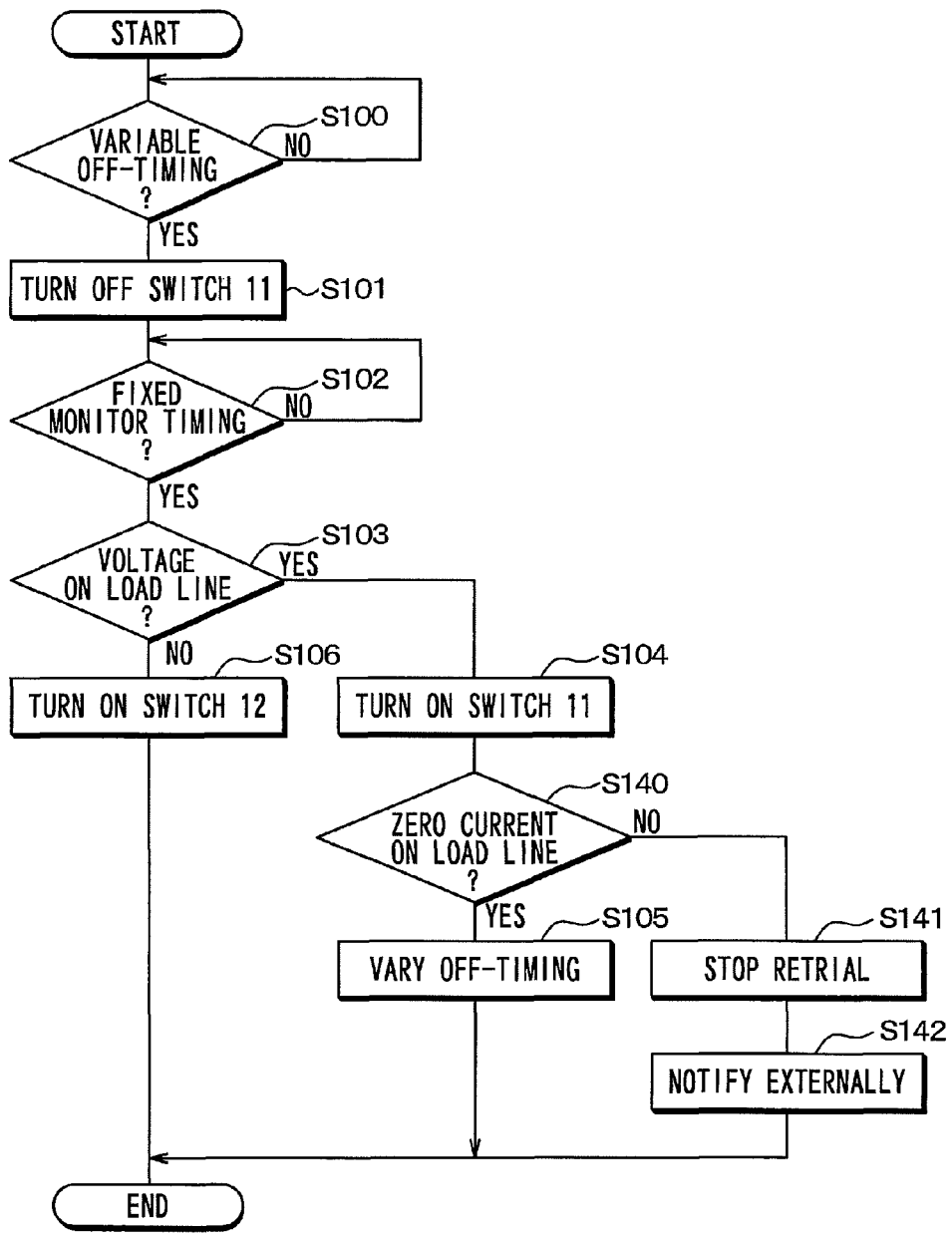

AC POWER SUPPLY SOURCE SWITCHING APPARATUS

CROSS REFERENCE TO RELATED APPLICATION

This application is based on Japanese patent application No. 2013-252279 filed on Dec. 5, 2013, the disclosure of which is incorporated herein by reference.

FIELD

The present disclosure relates to an AC power supply source switching apparatus.

BACKGROUND

Recently electric vehicles, which deliver less environmental burden than conventional vehicles using fossil fuel, are under development. If the electric vehicle is required to perform the same performance as the conventional vehicle, a high-cost secondary battery need be used and hence the secondary battery impedes wide application of electric vehicles.

It is proposed to provide a system, which promotes electric vehicles by effectively using a secondary battery of an electric vehicle as an electric power source for home use (for example, JP-A-2002-315193).

This system includes a switching device, which connects either one of a commercial AC power supply system and a secondary battery to a load at a home and disconnects the other and the home load. The switching device performs either one of a first state and a second state of connections. In the first state, the electric power is supplied from the commercial AC power supply system to the home load. In the second state, the electric power is supplied from the secondary battery to the home load.

For example, as shown in FIG. 24, a switching part 10A and a control part 60A, which controls the switching part 10A, are provided. The switching part 10A is formed of a switch 11a and a switch 12a. The switch 11a is a power supply system side switch provided between a commercial AC power supply system 5 and a load 3. The switch 12b is a secondary battery side switch provided between a secondary battery 2a mounted on an electric vehicle 2, which includes a DC-AC conversion part 2b, and the load 3.

For example, in a case that the power supply is switched from the first state, in which the load 3 is connected to the power supply system 5, to the second state, in which the load 3 is connected to the secondary battery 2a side, it is necessary for the control part 60A to turn off the switch 11a and then turn on the switch 12a after confirming that the switch 11a has actually been turned off so that the power supply system side and the secondary battery side are not connected to the load 3 at the same time. In addition, it is necessary to switch over from the first state to the second state in a short time so that the momentary shutdown of the power supply to the load 3 is avoided.

It is therefore proposed to confirm that the switch 11a actually turned off by checking whether the switch 11a actually turned off based on a load current flowing in a load line 4 between the switches 11a, 12a and the load 3 and a voltage waveform of an inter-phase AC voltage on the load line 4. However, the AC voltage waveform and the load current waveform, which appear immediately after the switch 11a is turned off, vary in accordance with the load 3. For this reason, it is likely that the switch 11a is erroneously determined to have not turned off although actually turned off. It is also likely that the switch 11a is erroneously determined to have turned off although not actually turned off in a case that the switch 11a has an on-failure. The on-failure is a failure that the switch 11a does not switch over from an on-state to an off-state, thus persistently remaining in the on-state.

SUMMARY

It is therefore an object to provide an AC power supply source switching apparatus, which shortens a switching time required for switching from a state that one of a power supply system and a secondary battery is connected to a load, to a state that the other of the power supply system and the secondary battery is connected to the load.

According to one aspect, an power source switching apparatus is provided for selectively switching over power supply to a load from two power supply sources, which includes a power supply system for supplying system power as AC power and a DC-AC conversion part for converting output power of a secondary battery to AC power. The AC power source switching apparatus comprises a first switch interposed between a load and one of the two power supply sources, a second switch interposed between the load and an other of the two power supply sources, and a switching control part for controlling the first switch and the second switch. The switching control part includes a first control section, a check section and a second control section. The first control section turns off the first switch at a time of switchover from a first state that the load is connected to one of the two power supply sources to a second state that the load is connected to the other of the two power supply sources. The check section checks whether the first switch actually turned off after the control section turned off the first switch. The second control section turns on the second switch after the check section determines that the first switch actually turned off. At least one of the first control section and the check section operates again when the check section determines that the first switch did not actually turn off.

BRIEF DESCRIPTION OF THE DRAWINGS

FIG. 21 is a flowchart showing switching processing executed by a control part according to a fourth embodiment;

EMBODIMENT

Figure 1:
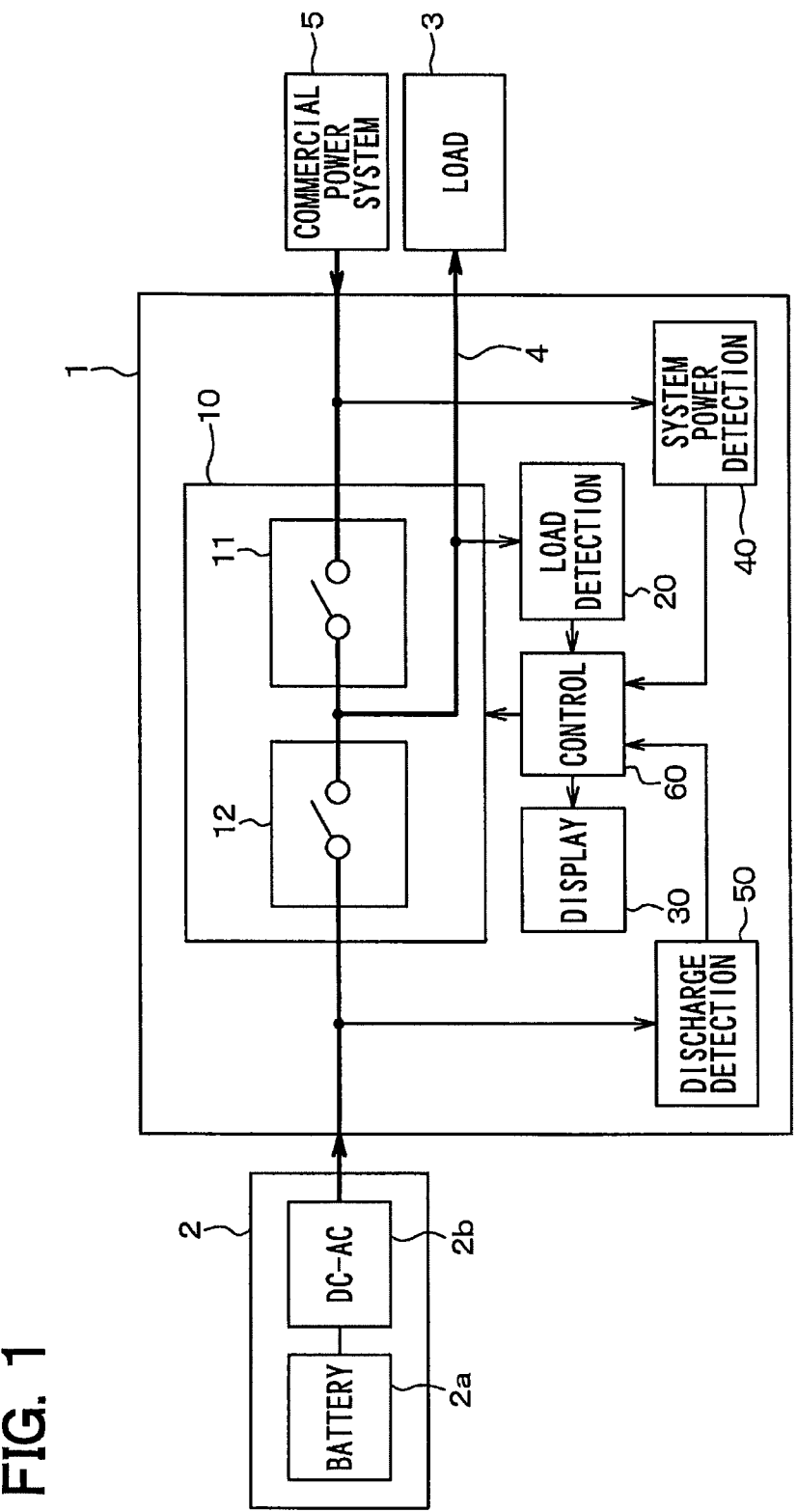
FIG. 1 is an electric circuit diagram showing an AC power source switching apparatus according to a first embodiment.

An AC power supply source switching apparatus will be described below with reference to embodiments shown in the drawings. In the following embodiments, same or similar parts are designated with same reference numerals in the drawings for brevity of description.

First Embodiment

FIG. 1 shows an electric circuit diagram of an AC power supply source switching apparatus 1 according to a first embodiment. As shown in FIG. 1, the AC power source switching apparatus 1 includes a switching part 10, a load state detection part 20, a display part 30, a system power detection part 40, a discharge power detection part 50 and a control part 60.

The switching part 10 is provided for connecting either one of the power supply system 5 and a DC-AC conversion part 2b of an electric vehicle 2 to a load 3 and includes switches 11 and 12. The load 3 is an electric device such as electric home appliances in a home. The electric device in the present embodiment is a non-linear load, which has an inverter circuit and the like for example and varies its impedance. The power supply system 5 is a commercial AC power supply system, which supplies homes and facilities with two-phase AC power of 50 Hz or 60 Hz.

The switch 11 is provided between the power supply system 5 and the load 3. The switch 11 connects the power supply system 5 and the load 3 when turned on to an on-state and disconnects the power supply system 5 and the load 3 when turned off to an off-state. The switch 12 is provided between the DC-AC conversion part 2b and the load 3. The switch 12 connects the DC-AC conversion part 2b of the vehicle 2 and the load 3 when turned on to an on-state and disconnects the DC-AC conversion part 2b and the load 3 when turned off to an off-state. A secondary battery 2a is provided for primarily supplying an electric motor for vehicle travel with DC electric power and may be a lithium-ion battery for example. The switches 11 and 12 are AC semiconductor switches such as triacs or contact-type relay switches each having a fixed contact and a movable contact. The vehicle 2 is provided with the secondary battery 2a and the DC-AC conversion part 2b. The DC-AC conversion part 2b converts DC power of the secondary battery 2a to two-phase AC power, which is supplied to the load 3.

The load detection part 20 includes a current detection circuit for monitoring a load current, which flows in a load line 4 between the switch 11, 12 and the load 3, and a voltage detection circuit for monitoring an inter-phase voltage of the load line 4. The load line 4 is formed of two power supply lines, between which an inter-phase voltage is developed. A display part 30 is a display panel for notifying externally various information. The system power detection part 40 monitors AC power supplied from the power supply system 5 to the load 3 side. The discharge power detection part 50 monitors AC power discharge to the load 3 side from the secondary battery 2a through the DC-AC conversion part 2b. The AC power supplied from the power supply system 5 to the load 3 side and the AC power discharged from the DC-AC conversion part 2b to the load 3 side are synchronized. In the following description, for simplification of description, the AC power supplied from the power supply system 5 to the load 3 side is referred to as system power and the AC power discharged from the secondary battery 2a to the load 3 side through the DC-AC conversion part 2b is referred to as discharge power.

The control part 60 is formed of a microcomputer, a memory and the like and is configured to execute switching processing for the control switches 11 and 12. The switching processing includes two processing. One processing is for switching over from a state that the load 3 is connected to the power supply system 5 and to a state that the load 3 is connected to the secondary battery 2a side. The other processing is for switching over from the state that the load 3 is connected to the secondary battery 2a side to the state that the load 3 is connected to the power supply system 5. In the following description, for simplification of description, the switching processing for switching over from the state that the load 3 is connected to the power supply system 5 to the state that the load 3 is connected to the secondary battery 2a side is referred to as first switching processing. The switching processing for switching over from the state that the load 3 is connected to the secondary battery 2a side to the state that the load 3 is connected to the power supply system 5 is referred to as second switching processing.

The first switching processing and the second switching processing executed by the control part 60 in the first embodiment will be described next.

(First Switching Processing)

Figure 2:
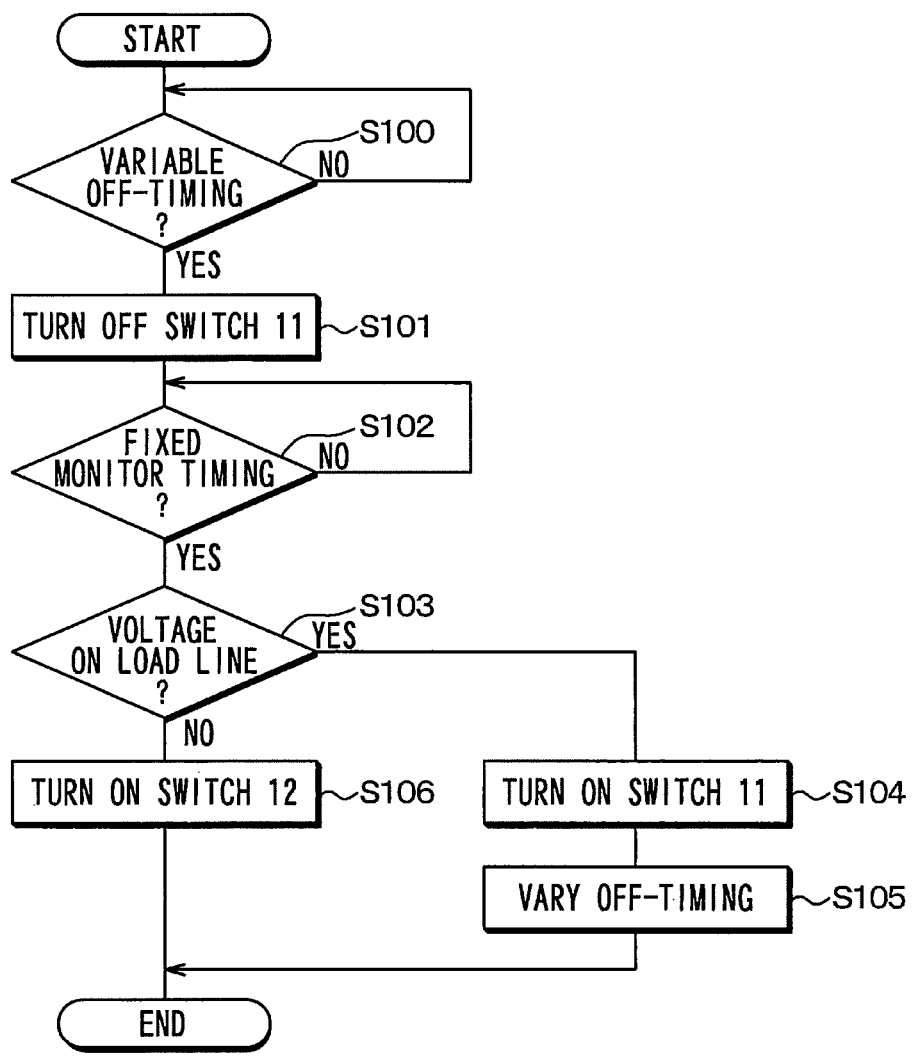
FIG. 2 is a flowchart showing switching processing executed by a control part according to the first embodiment.

FIG. 2 is a flowchart showing the first switching processing. In FIG. 2 and other figures showing flowcharts, S indicates a step. In FIG. 3, which is a time chart, (a) and (g) show system power, (b) and (h) show discharge power, (c) and (i) show load current, (d) and (j) show on/off of the switch 11, and (e) and (k) show on/off of the switch 12, (f) and (m) show load power. In FIG. 3, (a), (b), (c), (d), (e) and (f) are time charts showing the state of the switch 11 before a turn-off time point is varied. In FIG. 3, (g) to (m) are time charts showing the state of the switch 11 after the turn-off time point has been varied.

The control part 60 executes the first switching processing as shown in FIG. 2.

It is first checked at step 100 whether the present time reached a time point for turning off the switch 11 (turn-off time point). The turn-off time point used in first checking at step 100 is a time point, which corresponds to a predetermined phase of the system power supplied from the power supply system 5. The time point corresponding to the predetermined phase is a time point, at which an instantaneous value of the commercial AC power attains a predetermined value.

When it is determined at step 100 that the present time did not reach the turn-off time point (off-timing) of the switch 11, NO is outputted and step 100 is repeated. For this reason, step 100 repeats outputting NO unless the present time reaches the turn-off time point of the switch 11. Then when it is determined that the present time reached the turn-off time point of the switch 11, step 100 outputs YES. At a next step 101, the switch 11 is turned off, that is, the switch 11 is controlled to turn off. It is checked next at step 102 whether the present time reached a time point for monitoring the inter-phase voltage of the load line 4 (monitor timing). The monitor time point in the first embodiment is a time point, which corresponds to a predetermined phase of the discharge power of the secondary battery 2a side. When it is determined at step 102 that the present time did not reach the monitor time point, NO is outputted and step 102 is repeated. For this reason, step 102 repeats outputting NO unless the present time reaches the monitor time point. Then when it is determined that the present time reached the monitor time point, step 102 outputs YES. At a next step 103, by monitoring the AC voltage of the load line 4 by the load detection part 20, it is checked based on a monitor result whether an AC voltage is generated as the AC voltage on the load line 4.

For example, when an impedance of the load 3 is high, the AC voltage is generated on the load line 4 due to a small current caused by parasitic capacitances of the load line 4 and the load 3 as well as residual charge of the load 3. In this case, it is determined at step 103 that the AC voltage is generated on the load line 4 and YES is outputted. That is, it is determined that the switch 11 did not actually turn off.

Then, the switch 11 is turned on at step 104, that is, the switch 11 is controlled to turn on. At next step 105, the turn-off time point of the switch 11 is varied. This varied time point is different from the previous turn-off time point of the switch 11 and corresponds to a different phase in electrical angle of an AC voltage waveform. That is, the varied turn-off time point is a time point, at which an instantaneous value of the AC power attains a predetermined value different from that of the previous turn-off time point.

Then returning to step 100, that is, at the next cycle of execution of the first control processing, it is checked again whether the present time reached the varied turn-off time point. NO is outputted at step 100 until the resent time reaches the varied turn-off time point. When it is determined that the present time reached the varied turn-off time point, YES is outputted at step 100. Then at step 101, the switch 11 is turned off. At step 102, it is checked whether the present time reached the monitor time point for monitoring the AC voltage of the load line 4. NO is repeatedly outputted at step 102 until it is determined that the present time reaches the monitor time point for monitoring the AC voltage of the load line 4. When the present time reaches the monitor time point later, YES is outputted at step 102.

Then, by monitoring the AC voltage of the load line 4 by the load detection part 20, it is determined based on the monitor result whether the AC voltage is generated as the AC voltage on the load line 4. Thus YES is outputted at step 103. Then, the switch 11 is turned on again at step 104. At next step 105, the turn-off time point of the switch 11 is varied again. This varied time point is different from the previously varied turn-off time point of the switch 11 and corresponds to a different phase. As long as the AC voltage is continuously developed on the load line 4, steps 100, 101, 102, 103 (YES), step 104 and step 105 are repeated, that is, tuning off of the switch 11 and checking of the AC voltage on the load line 4 are operated again as a retrial.

Figure 3A:
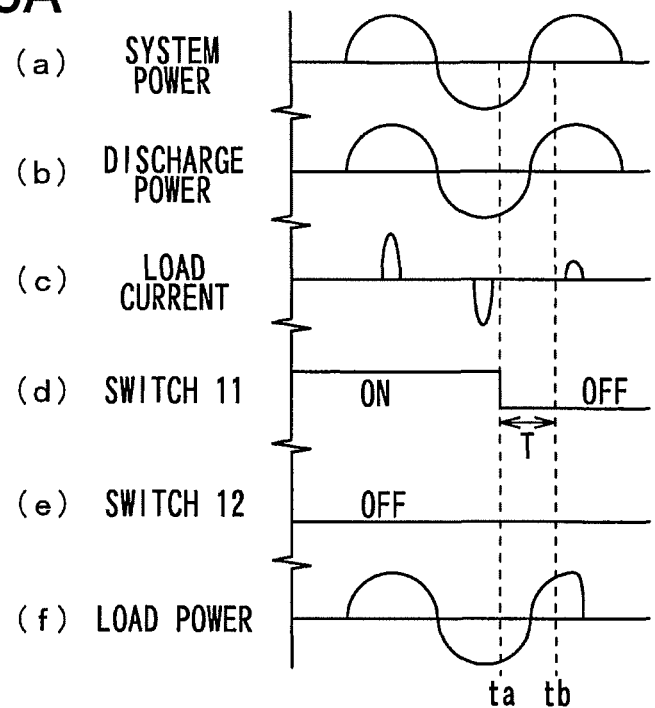
FIG. 3A and FIG. 3B are time charts showing the switching processing executed by the control part according to the first embodiment.
Figure 3B:
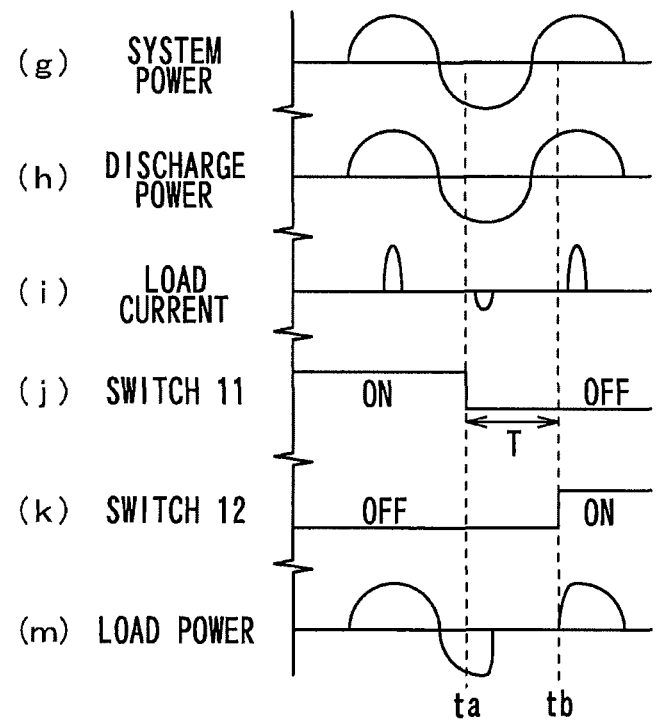

Here, the turn-off time point ta determined at (N+1) step 101, which is executed (N+1)th time after execution of N times previously, becomes a time point of different phase from the turn-off time point ta determined at the Nth step 101, which was executed at the previous time. The monitor time point tb of the (N+1)th execution of step 103 is equal in phase to the monitor time point tb of Nth step 103. The turn-off time point ta of step 101 is a time point for turning off the switch 11 at step 101. The monitor time point of step 103 is a time point for monitoring the AC voltage of the load line 4 at step 103. A time interval T between the turn-off time point ta of (N+1)th step 101 and the monitor time point tb of (N+1)th step 103, which is shown in FIG. 3B, becomes longer than a time interval T between the turn-off time point ta of Nth step 101 and the monitor time point tb of Nth step 103, which is shown in FIG. 3A.

When the impedance of the load 3 decreases and the load current flows in the load line 4, the AC voltage does not appear on the load line 4. As a result; it is determined at step 103 that the switch 11 actually turned off. Thus, NO is outputted at step 103. That is, it is confirmed that the switch 11 actually turned off. Then, at step 106, the switch 12 is turned on, that is, the switch 12 is controlled to turn on. Thus the first switching processing is finished.

(Second Switching Processing)

The control part 60 also executes the second switching processing in the similar manner as described above with reference to FIG. 2. The second switching processing is substantially the same as the first switching processing except that the switch 12 is turned off at step 101, the switch 11 is turned on at step 106 and the switch 12 is turned on at step 104. The second switching processing will be described below.

In the second switching processing, it is checked at step 100 in FIG. 2 whether the present time reached the turn-off time point for turning off the switch 12. At step 101 the switch 12 is turned off. It is checked at step 102 whether the present time reached the monitor time point for monitoring the AC voltage of the load line 4. It is checked at step 103 whether the AC voltage is developed on the load line 4. At step 104, the switch 12 is turned on. At step 105 the turn-off time point of the switch 12 is varied. At step 106, the switch 11 is turned on.

In the second switching processing, similarly to the first switching processing, steps 100, 101, 102, 103 (YES), 104 and 105 are repeated as long as the AC voltage is continuously developed on the load line 4. At this time, the turn-off time point ta of (N+1)th step 101 becomes the time point different in phase from the turn-off time point of Nth step 101. The monitor time point tb of (N+1)th step 103 is the time point of the same phase as the monitor time point of Nth step 103. The time interval T between the turn-off time point ta of (N+1)th step 101 and the monitor time point tb of (N+1)th step 103 becomes longer than the time interval T between the turn-off time point ta of Nth step 101 and the monitor time point tb of Nth step 103.

According to the first embodiment described above, the AC voltage of the load line 4 is monitored by the load detection part 20 after the switch 11 (12) is turned off. When it is determined based on the monitored result that the switch 11 (12) did not actually turn off, execution of processing of step 100 and subsequent steps is retried. Thus it is possible to shorten the time interval from when the switch 11 (12) is turned off to when the switch 12 (11) is turned on. It is thus possible to shorten the time interval from a state that the load 3 is being connected to one of two power supply sources, that is, the power supply system 5 and the secondary battery 2a side, to a state that the load is connected to the other of the two power supply sources.

According to the first embodiment, the control part 60 makes the time interval T between the turn-off time point ta of (N+1)th step 101 and the monitor time point tb of (N+1)th step 103 longer than the time interval T between the turn-off time point to of Nth step 101 and the monitor time point tb of Nth step 103. For this reason, when it is determined that the switch 11 (12) is not actually turned off, the AC voltage on the load line 4 is likely to disappear in the time interval T. For this reason, it is possible to increase the accuracy of determination that the switch 11 (12) actually turned off.

According to the first embodiment, the control part 60 monitors the AC voltage of the load line 4 by the load detection part 20 after turning off the switch 11 (12) at step 101, checks based on the monitored result whether the AC voltage is developed as the AC voltage on the load line 4 and checks whether the switch 11 (12) actually turned off. Thus it is possible to check with high accuracy whether the switch 11 (12) turned off actually.

[First Modification of First Embodiment]

In the first embodiment described above, the switch 11 (12) is turned off at the turn-off time point of different phase as one example each time step 101 is executed. Alternatively, according to a first modification, the AC voltage of the load line 4 is monitored at the monitor time point of different phase as another example each time step 103 is executed.

The first switching processing and the second switching processing executed by the control part 60 in the first modification of the first embodiment will be described next separately.

(First Switching Processing)

Figure 4:
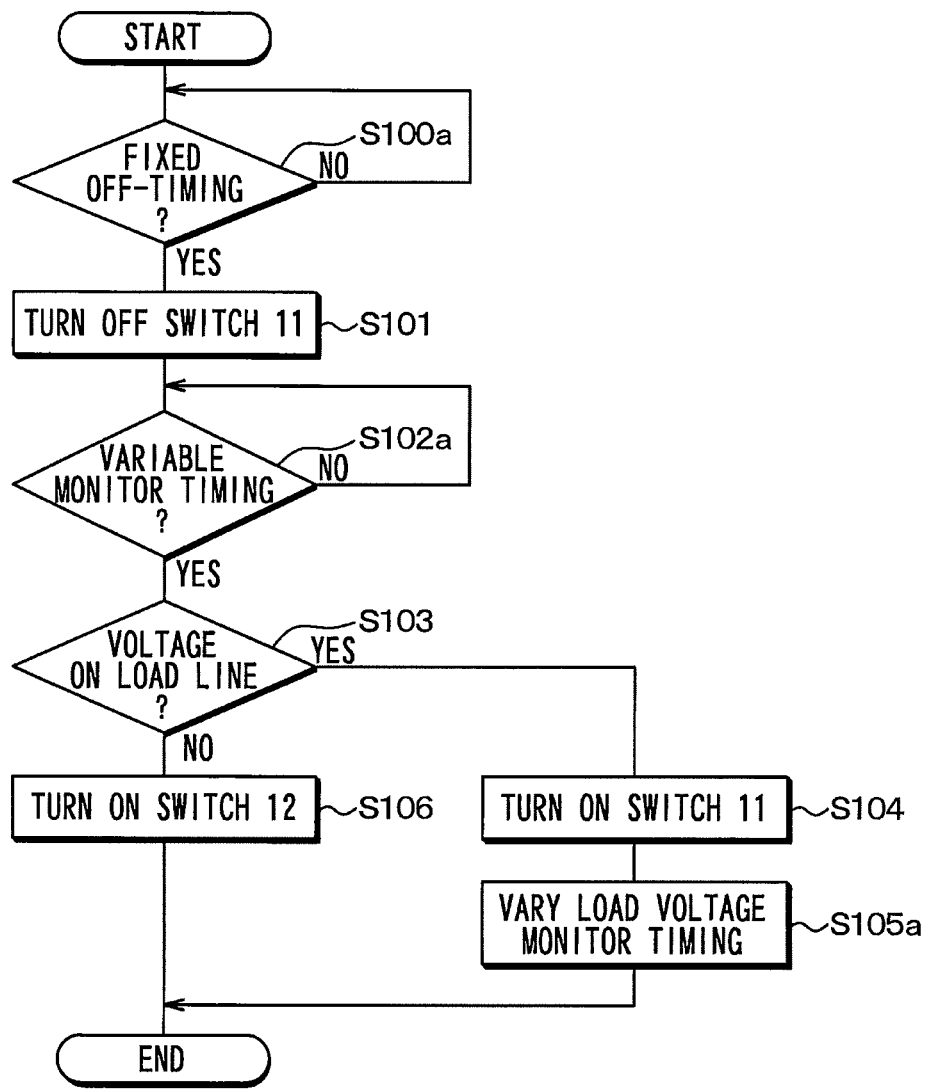
FIG. 4 is a flowchart showing switching processing executed by a control part according to a first modification of the first embodiment.
Figure 5A:
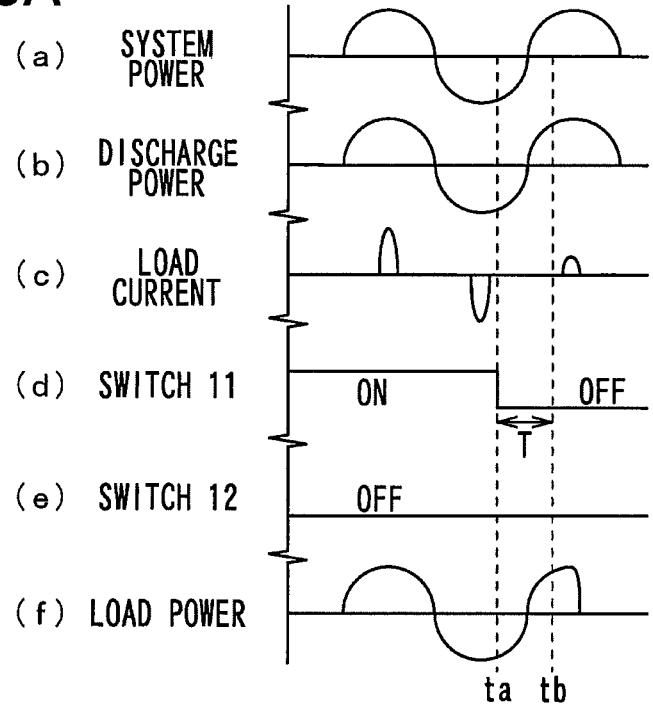
FIG. 5A and FIG. 5B are time charts showing the switching processing executed by the control part according to the first modification of the first embodiment.
Figure 5B:
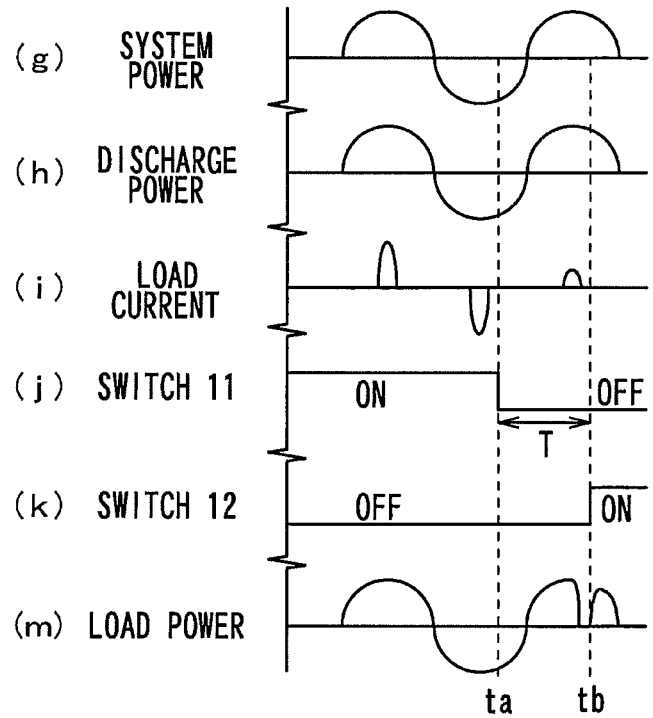

FIG. 4 is a flowchart showing the first switching processing. In FIG. 5, (a) to (m) correspond to (a) to (m) in FIG. 3 and show the system power, the discharge power, the load current, the on/off of the switch 11, the on/off of the switch 12, and the load power.

In the flowchart of FIG. 4, step 100a and step 105a are provided in place of step 100 and step 105 provided in FIG. 2, respectively.

It is checked at step 100a whether the present time reached the turn-off time point of the switch 11. The turn-off time point referred to in step 100a is the time point of the same phase as the system power at every execution of step 100a. At step 105a the monitor time point for monitoring the AC voltage of the load line 4 is varied. The varied monitor time point becomes different in phase from the previous monitor time point for monitoring the load voltage at step 103. That is, the varied monitor time point is the time point, at which the AC power exhibits different instantaneous value from that exhibited at the previous turn-off time point.

For this reason, steps 100a, 101, 102, 103 (YES), 104 and 105a are repeated as long as the AC voltage is developed continuously on the load line 4. At this time, the turn-off time point ta of (N+1)th step 101 becomes the time point of same phase as the turn-off time point of Nth step 101. The monitor time point tb of (N+1)th step 103 is the time point of different phase from the monitor time point of Nth step 103. The time interval T between the turn-off time point ta of (N+1)th step 101 and the monitor time point tb of (N+1)th step 103 shown in FIG. 5B becomes longer than the time interval T between the turn-off time point ta of Nth step 101 and the monitor time point tb of Nth step 103 shown in FIG. 5A.

(Second Switching Processing)

The control part 60 executes the second switching processing as shown in FIG. 4. The second switching processing is substantially the same as the first switching processing except that the switch 12 is turned off at step 101 in place of the switch 11, the switch 11 is turned on at step 106 and the switch 12 is turned on at step 104. The second switching processing will be described below.

According to the first modification of the first embodiment described above, the control part 60 monitors the AC voltage of the load line 4 by the load detection part 20 and retries the processing of step 100a and subsequent steps when it is determined based on the monitored result that the switch 11 (12) did not actually turn off. It is thus possible to shorten the time interval from a state that the load 3 is being connected to one of the two power supply sources, that is, the power supply system 5 and the secondary battery 2a side, to a state that the load 3 is connected to the other of the two power sources.

[Second Modification of First Embodiment]

According to a second modification of the first embodiment, the first embodiment and the first modification are combined so that the switch 11 (12) is turned off at the turn-off time point of different phase at each execution of step 101 and the AC voltage of the load line 4 is monitored at the monitor time point of different phase at each execution of step 103.

The first switching processing and the second switching processing executed by the control part 60 in the second modification of the first embodiment will be described next separately.

(First Switching Processing)

Figure 6:
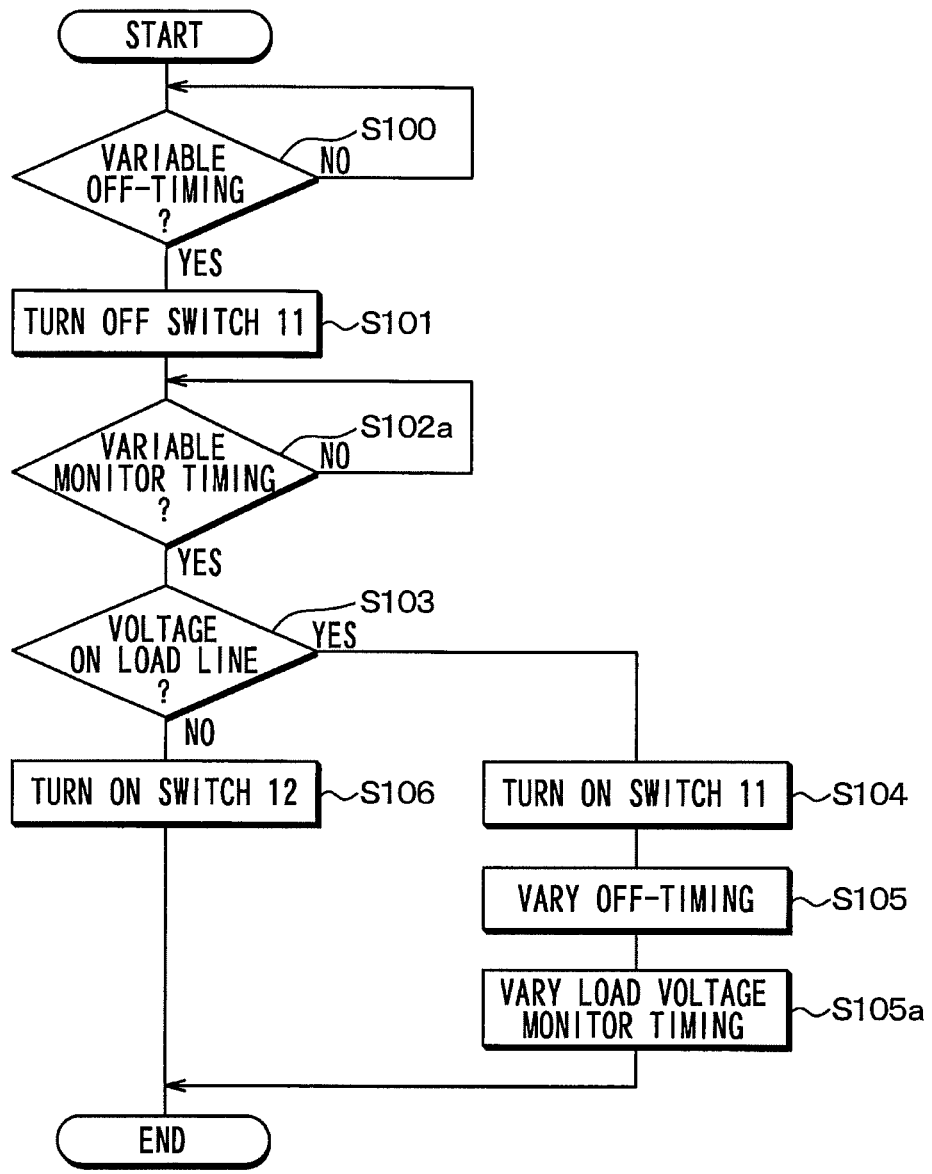
FIG. 6 is a flowchart showing switching processing executed by a control part according to a second modification of the first embodiment.

FIG. 6 is a flowchart showing the first switching processing in the second modification.

In FIG. 7, (a) to (m) correspond to (a) to (m) in FIG. 3 and show the system power, the discharge power, the load current, the on/off of the switch 11, the on/off of the switch 12, and the load power.

In the flowchart of FIG. 6, step 102a and step 105a are provided in place of step 102 and step 105 provided in FIG. 2, respectively.

It is checked at step 102a whether the present time reached the monitor time point. At step 105a, the monitor time point, which is used at step 102a is varied since the turn-off time point was varied at step 105.

Similarly to the first modification, the varied monitor time point becomes different in phase from the monitor time point for monitoring the load voltage previously at step 103.

For this reason, steps 100, 101, 102a, 103 (YES), 104 105 and 105a are repeated as long as the AC voltage is developed continuously on the load line 4. At this time, the turn-off time point ta of (N+1)th step 101 becomes the time point of different phase from the turn-off time point of Nth step 101. The monitor time point tb of (N+1)th step 103 also is the time point of different phase from the monitor time point of Nth step 103

Figure 7A:
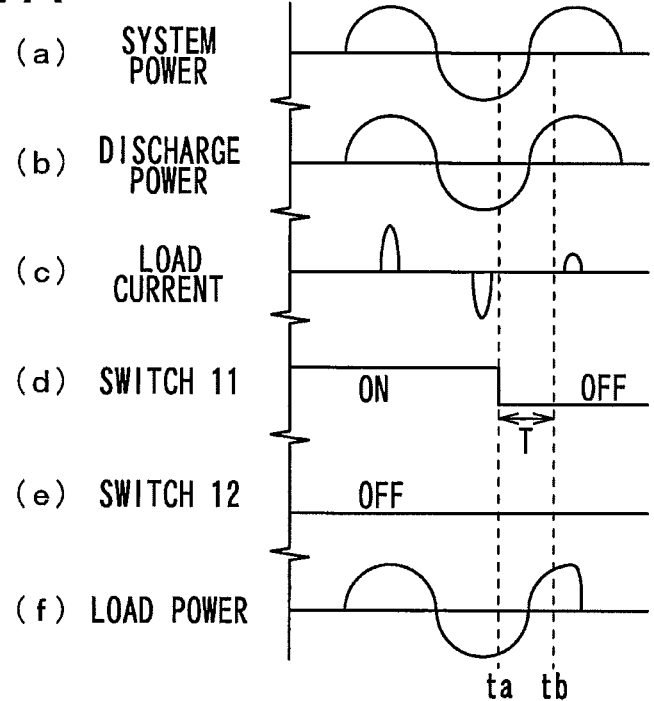
FIG. 7A and FIG. 7B are time charts showing the switching processing executed by the control part according to the second modification of the first embodiment.
Figure 7B:
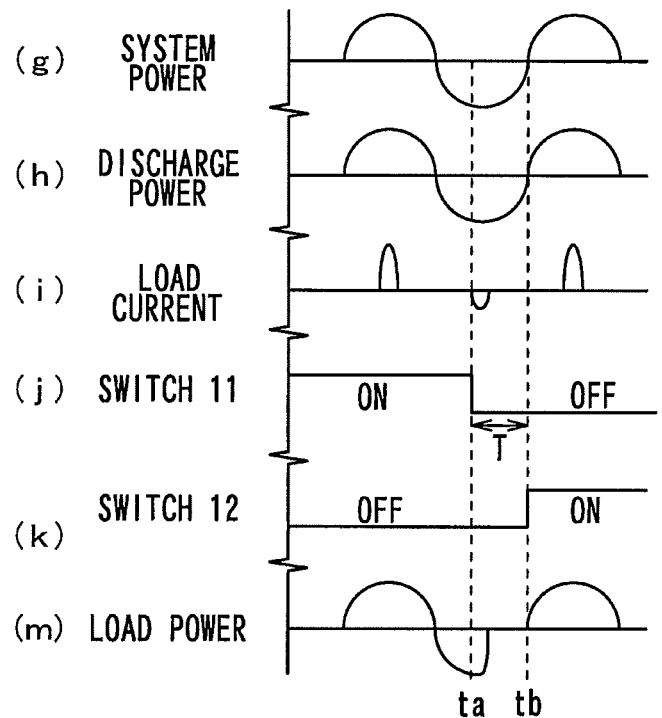

According to the second modification, as shown in FIG. 7A and FIG. 7B, the time interval T between the turn-off time point ta of Nth step 101 and the monitor time point tb of Nth step 103 becomes equal to the time interval T between the turn-off time point ta of (N+1)th step 101 and the monitor time point tb of (N+1)th step 103.

(Second Switching Processing)

The control part 60 executes the second switching processing as shown in FIG. 6. The second switching processing is substantially the same as the first switching processing except that the switch 12 is turned off at step 101, the switch 11 is turned on at step 106 and the switch 12 is turned on at step 104. The second switching processing will therefore not be described.

Second Embodiment

According to a second embodiment, the number of times of turning off the switch 11 is limited as opposed to the first embodiment.

The first switching processing and the second switching processing in the second embodiment will be described below separately.

(First Switching Processing)

Figure 8:
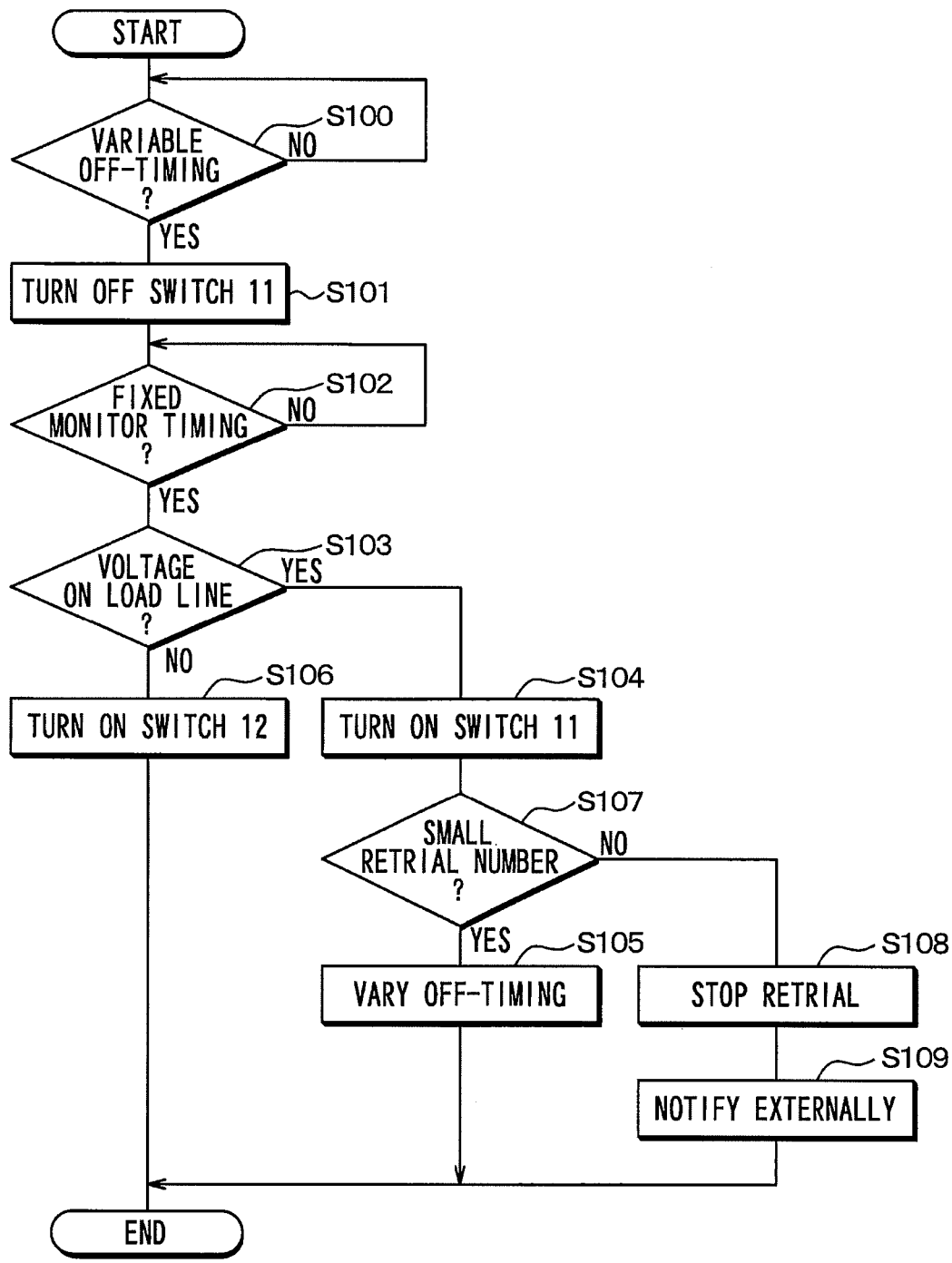
FIG. 8 is a flowchart showing switching processing executed by a control part according to a second embodiment.

The control part 60 executes the first switching processing as shown in FIG. 8. In the flowchart of FIG. 8, steps 107, 108 and 109 are provided in addition to the flowchart of FIG. 2. It is checked at step 107 whether the number of times of retrying (number of retrials) step 100 and subsequent steps is equal to or smaller than a predetermined number. The number of retrials is the number of times of executions of step 107 and equal to the number (N−1), which results from subtracting 1 from the number N of executions of step 101. That is, it is checked at step 107 whether the number of times of determining YES at step 103 is equal to or smaller than the predetermined value. At step 108, the first switching processing is stopped, that is, a further retrial is stopped. At step 109, the display part 30 displays a notification that the first switching processing is stopped. For this reason, it is checked at step 107 whether the number of retrials is equal to or smaller than the predetermined value after executing steps 100, 101, 102, 103 (YES) and 104. The predetermined value is a maximum value of the number of retrials. When the number of retrials is equal to or smaller than the predetermined value, YES is outputted at step 107 and step 105 is executed. When the AC voltage continues to appear on the load line 4 and the number of retrials is equal to or smaller than the predetermined value, steps 100, 101, 102, 103 (YES), 104, 107 (YES) and 105 are repeated.

When the number of retrials exceeds the predetermined value, NO is outputted at step 107. The first switching processing is stopped at step 108 and the notification of stopping of the first switching processing is displayed on the display part 30. Thus it is possible to notify externally that the first switching processing is stopped. When the number of retrials is equal to or smaller than the predetermined value and the AC voltage on the load line 4 disappears, NO is outputted at step 103. The switch 16 is turned on at step 106.

(Second Switching Processing)

The control part 60 executes the second switching processing as shown in FIG. 8. The second switching processing is substantially the same as the first switching processing except that the switch 12 is turned off at step 101, the switch 11 is turned on at step 106 and the switch 12 is turned on at step 104. The second switching processing will not be described.

According to the second embodiment described above, the control part 60 retries execution of processing of step 100 and subsequent steps when it is determined that the switch 11 (12) did not actually turn off. As a result, similarly to the first embodiment, it is possible to shorten the time interval required for switchover from the state that the load 3 is connected to one of the two power supply sources, that is, the power supply system 5 and the secondary battery 2a side to the state that the load 3 is connected to the other of the two power supply sources.

Third Embodiment

In the first embodiment, the switch 11 (12) is turned off at the different time points each time step 101 is executed. Alternatively, according to a third embodiment, the switch 11 (12) is turned off at a turn-off time point, which is predicted based on a load current.

The first switching processing and the second switching processing in the third embodiment will be described next separately.

(First Switching Processing)

Figure 9:
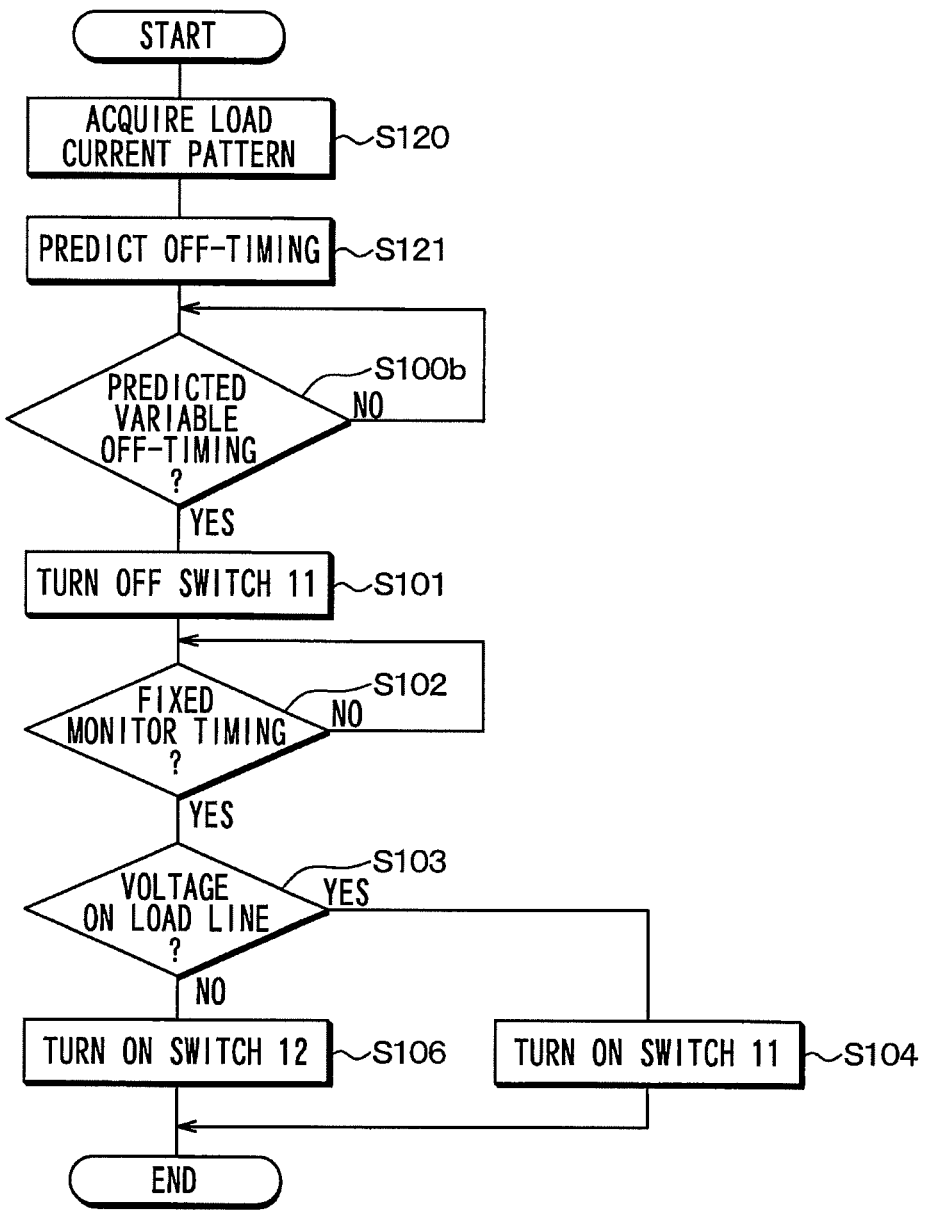
FIG. 9 is a flowchart showing switching processing executed by a control part according to a third embodiment.
Figure 10:
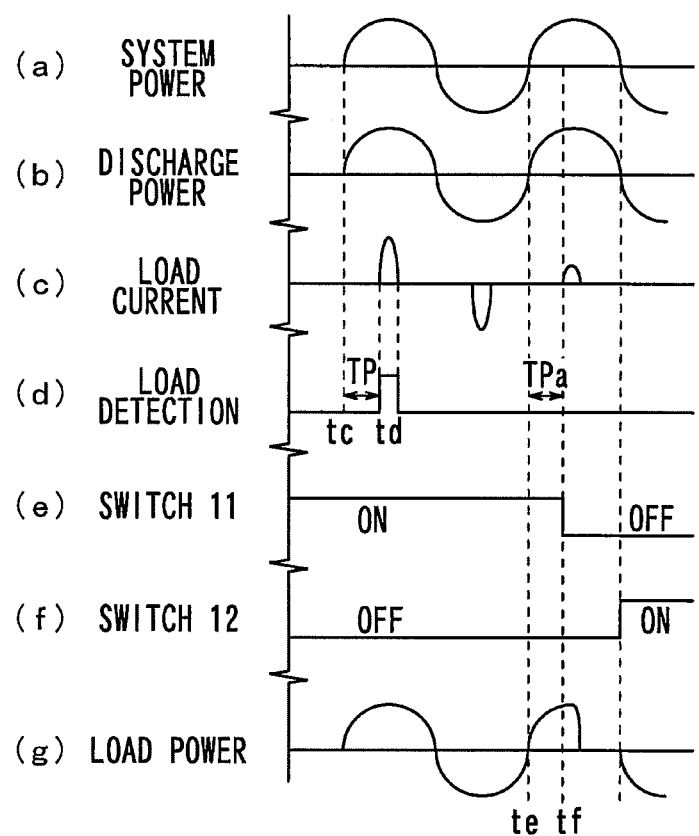
FIG. 10 is a time chart showing the switching processing executed by the control part according to the third embodiment.

FIG. 9 is a flowchart showing the first switching processing executed by the control part 60. In FIG. 10, which is a time chart, (a) shows the system power, (b) shows the discharge power, (c) shows the load current, (d) shows the load detection state, (e) shows the on/off of the switch 11, (f) shows the on/off of the switch 12, and (g) shows the load power.

In the flowchart of FIG. 9, steps 120, 121 and 100b are provided in place of steps 100 and 105 provided in FIG. 2.

At step 120, the current flowing in the load line 4 (referred to as load current below) is monitored by the load detection part 20 and a pattern of the load current (that is, waveform of load current) is acquired.

At step 121, the turn-off time point of the switch 11 is predicted based on the pattern of the load current. Specifically, assuming that the instantaneous value of the power becomes zero at time point tc at the time of rising of the supply power and the current value becomes zero at time point td at the time of rising of the current waveform of the load current, a time interval between the time point tc and the time point td is defined as a time interval TP. The time of rising indicates a time point when the instantaneous value of the power (or current) increases as time passes. The time point, which is after an elapse of a predetermined time interval TPa from a time point te, at which the instantaneous value of power becomes zero at the time of rising of the system power after the time point tc, is determined as a turn-off time point tf. In the third embodiment, the time interval TPa is made equal to the time interval TP. That is, the turn-off time point tf is determined based on the time interval TP. It is checked at step 100b whether the present time reached the turn-off time point, which is predicted at step 121.

In the first switching processing according to the third embodiment, when the present time reaches the turn-off time point predicted at step 121 through step 120, YES is outputted at step 100b and the switch 11 is turned off at step 101. Then when the present time reaches the monitor time point, YES is outputted at step 102. At next step 103, the AC voltage of the load line 4 is monitored by the load detection part 20. Based on the monitor result, it is determined that the AC voltage is developed on the load line 4 and NO is outputted. As a result, the switch 11 is turned on at step 104. When the AC voltage continues to develop on the load line 4, steps 120, 121, steps 100b, 101, 102, step 103 (YES) and step 104 are repeated. Then when the AC voltage on the load line 4 disappears, NO is outputted at step 103 and the switch 12 is turned on at step 106.

(Second Switching Processing)

The control part 60 executes the second switching processing as shown in FIG. 9. The second switching processing is substantially the same as the first switching processing except that the switch 12 is turned off at step 101, the switch 11 is turned on at step 106 and the switch 12 is turned on at step 104. The second switching processing will be described below. Therefore the second switching processing will not be described.

According to the third embodiment described above, execution of the processing of step 120 and subsequent steps is retried when it is determined at step 103 that the switch 11 (12) did not actually turn off. For this reason, similarly to the first embodiment, it is possible to shorten the time interval required to switch over from the state that the load 3 is connected to one of the two power supply sources, that is, the power supply system 5 and the secondary battery 2a to the state that the load 3 is connected to the other of the two power supply sources.

[First Modification of Third Embodiment]

In the first modification of the first embodiment described above, the AC voltage of the load line 4 is monitored at the monitor time point of different phase at each execution of step 103. Alternatively, according to the first modification of the present embodiment, the AC voltage of the load line 4 is monitored at a monitor time point predicted based on the load current.

The first switching processing and the second switching processing executed in the present first modification will be described next separately.

(First Switching Processing)

Figure 11:
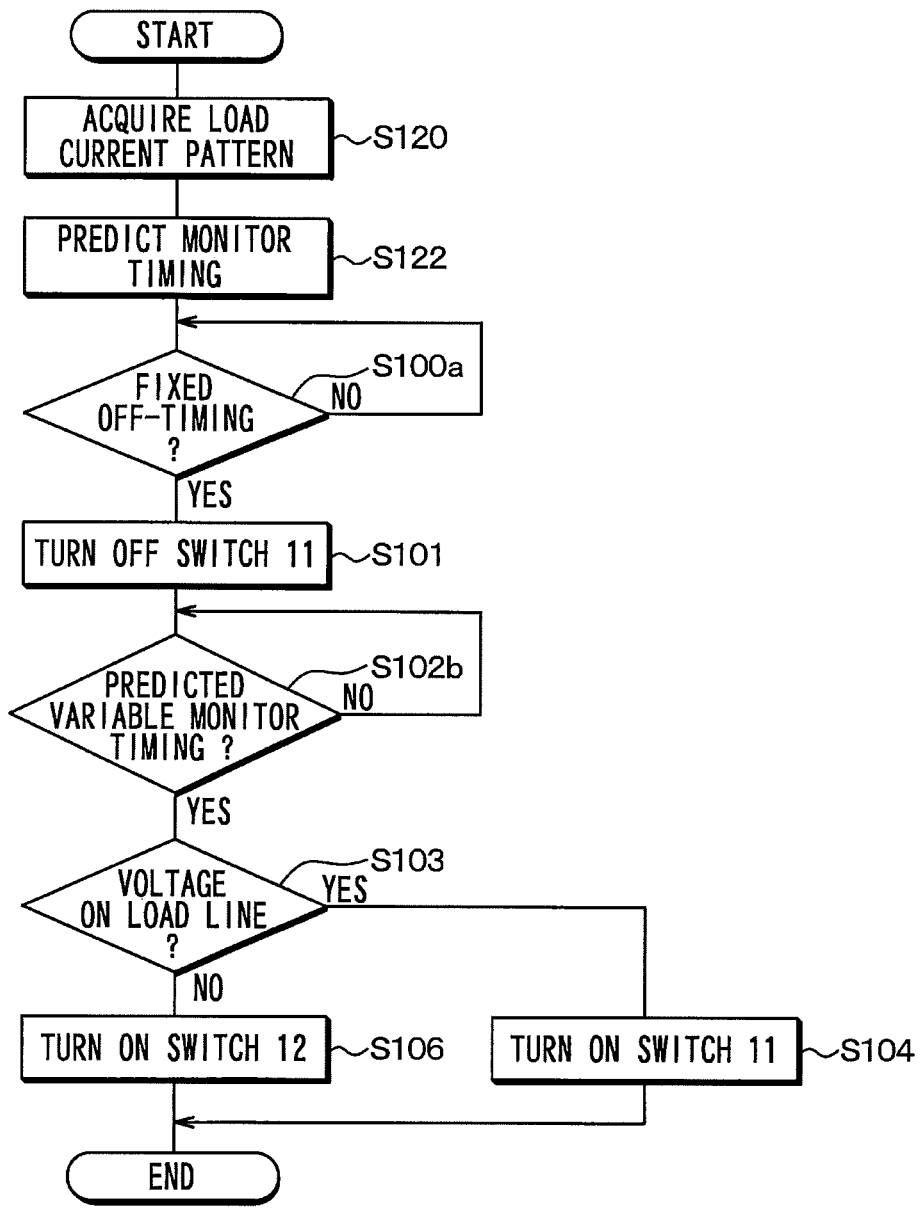
FIG. 11 is a flowchart showing switching processing executed by a control part according to a first modification of the third embodiment.
Figure 12:
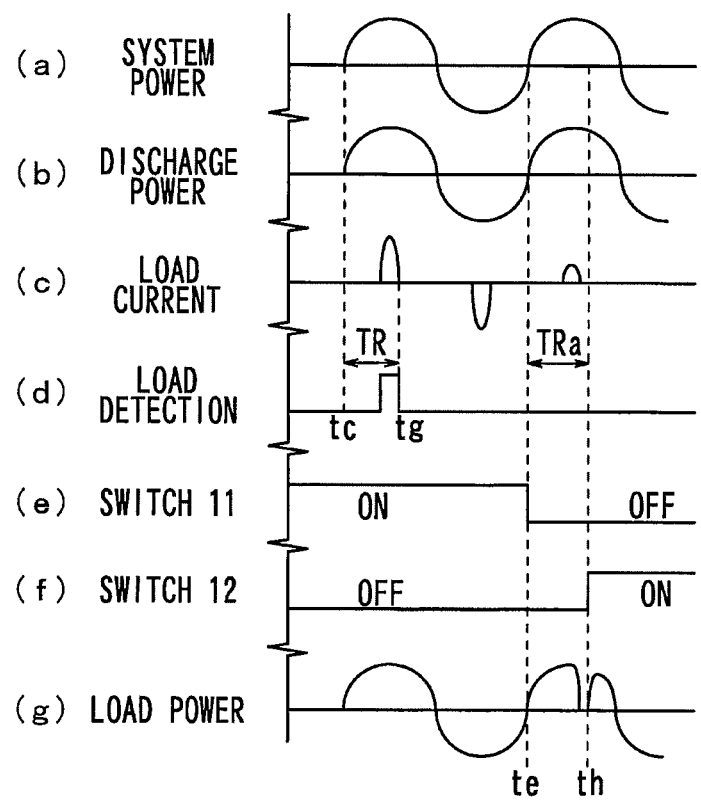
FIG. 12 is a time chart showing the switching processing executed by the control part according to the first modification of the third embodiment.

FIG. 11 is a flowchart showing the first switching processing. FIG. 12 is a time chart, in which (a) shows the system power, (b) shows the discharge power, (c) shows the load current, (d) shows the load state detection, (e) shows the on/off of the switch 11, (f) shows the on/off of the switch 12, and (g) shows the load power.

In the flowchart of FIG. 11, steps 120, 122 and 102b are provided in place of steps 102 and 105a provided in FIG. 4.

At step 120, the load current flowing in the load line 4 is monitored by the load detection part 20 and the pattern of the load current (that is, waveform of load current) is acquired.

At step 122, the monitor of step 103 is predicted based on the pattern of the load current. Specifically, assuming that the instantaneous value of the power becomes zero at the time point tc at the time of rising of the supply power and the instantaneous value of the power becomes zero at the time point tg at the time of falling of the current waveform of the load current, a time interval between the time point tc and the time point tg is defined as a time interval TR. The time of falling indicates a time point when the instantaneous value of the power (or current) decreases as time passes. The time point, which is after an elapse of a predetermined time interval TRa from the time point te, at which the instantaneous value of power becomes zero at the time of rising of the system power after the time point tc, is determined as a monitor time point th. In the first modification, the time interval TRa is made equal to the time interval TR. That is, the monitor time point th is determined based on the time interval TR. It is checked at step 102b whether the present time reached the monitor time point, which is predicted at step 122.

In the first switching processing according to the first modification of the third embodiment, when the present time reaches the turn-off time point through steps 120 and 122, YES is outputted at step 100a and the switch 11 is turned off (step 101). Then when the present time reaches the monitor time point, YES is outputted at step 102b. At next step 103, the AC voltage of the load line 4 is monitored by the load detection part 20. Based on the monitor result, it is determined that the AC voltage is developed on the load line 4 and YES is outputted. As a result, the switch 11 is turned on at step 104. When the AC voltage continues to develop on the load line 4, steps 120, 121, steps 100a, 101, 102, step 103 (YES) and step 104 are repeated. Then when the AC voltage on the load line 4 disappears, NO is outputted at step 103 and the switch 12 is turned on at step 106.

(Second Switching Processing)

The control part 60 executes the second switching processing as shown in FIG. 11. The second switching processing is substantially the same as the first switching processing except that the switch 12 is turned off at step 101, the switch 11 is turned on at step 106 and the switch 12 is turned on at step 104. Therefore the second switching processing will not be described below.

According to the first modification of the third embodiment described above, execution of the processing of step 120 and subsequent steps is retried when it is determined that the switch 11 (12) did not actually turn of For this reason, similarly to the first embodiment, it is possible to shorten the time interval required to switch over from the state that the load 3 is connected to one of the two power supply sources, that is, the power supply system 5 and the secondary battery 2a, to the state that the load 3 is connected to the other of the two power supply sources.

[Second Modification of Third Embodiment]

According to a second modification of the third embodiment, the third embodiment and the first modification of the third embodiment are combined so that the switch 11 (12) is turned off at the turn-off time point predicted based on the pattern of the load current and the AC voltage of the load line 4 is monitored at the monitor time point predicted based on the pattern of the load current.

The first switching processing and the second switching processing will be described next separately.

(First Switching Processing)

Figure 13:
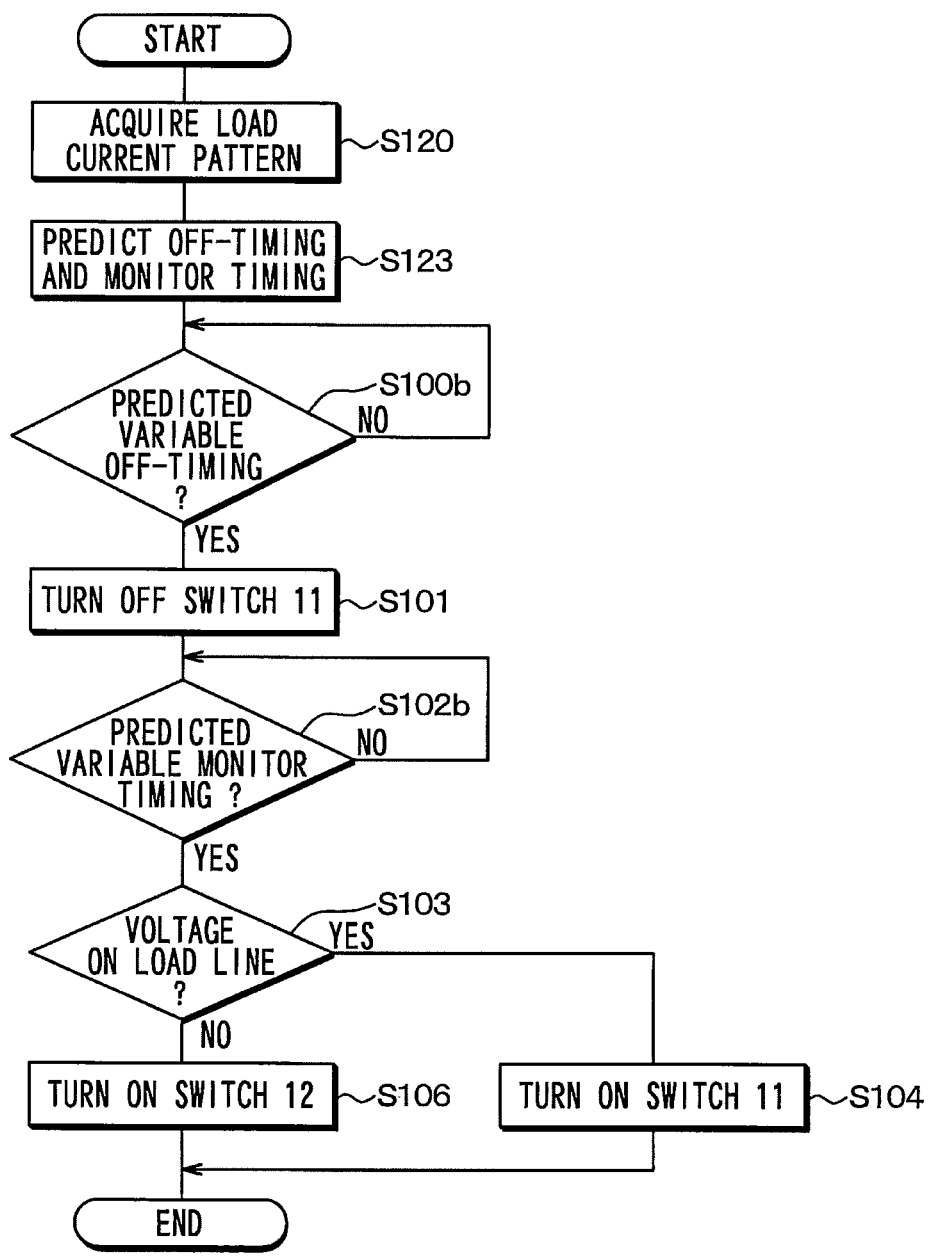
FIG. 13 is a flowchart showing switching processing executed by a control part according to a second modification of the third embodiment.
Figure 14:
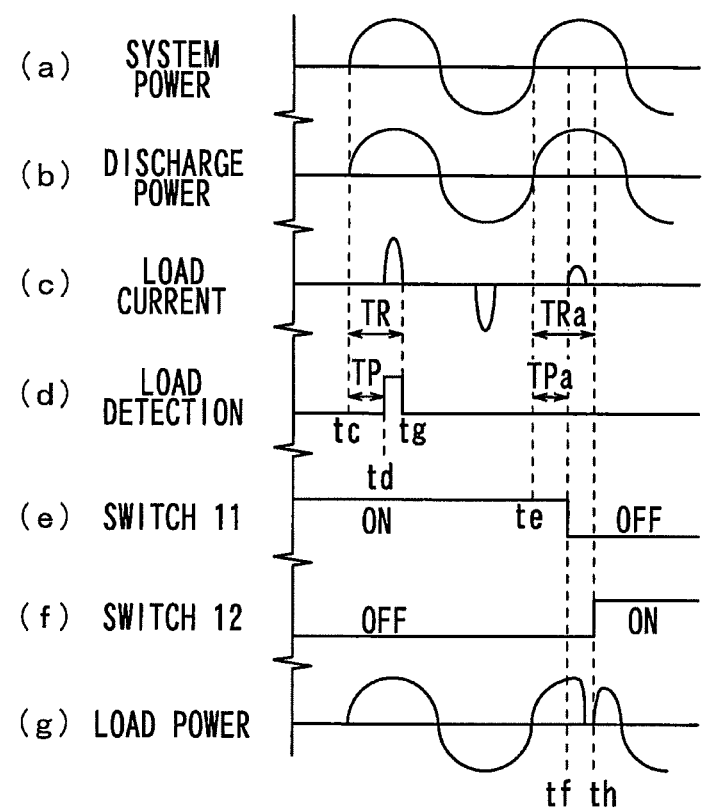
FIG. 14 is a time chart showing the switching processing executed by the control part according to the second modification of the third embodiment.

FIG. 13 is a flowchart showing the first switching processing executed by the control part 60. In FIG. 14, which is a time chart, (a) shows the system power, (b) shows the discharge power, (c) shows the load current, (d) shows the load state detection, (e) shows the on/off of the switch 11, (f) shows the on/off of the switch 12, and (g) shows the load power.

In the flowchart of FIG. 13, step 123 and step 102b are provided in place of steps 121 and 102 in FIG. 9, respectively. At step 123, the turn-off time point and the monitor time point are predicted based on the pattern of the load current. The turn-off time point is predicted in the same manner as the processing of step 121 shown in FIG. 9. The processing for predicting the monitor time point is similar to the processing of step 122 of the first modification shown in FIG. 11. It is checked at step 102b whether the present time reached the predicted monitor time point.

As described above, at step 123, the turn-off time point of the switch 11 and the monitor time point are predicted based on the pattern of the load current. The switch 11 is turned off at the predicted turn-off time point (step 101). Further, the AC voltage of the load line 4 is monitored by the load detection part 20 at the monitor time point predicted based on the pattern of the load current at step 103.

(Second Switching Processing)

The control part 60 executes the second switching processing as shown in FIG. 13. The second switching processing is substantially the same as the first switching processing except that the switch 12 is turned off at step 101, the switch 11 is turned on at step 106 and the switch 12 is turned on at step 104. Therefore the second switching processing will not be described below.

According to the second modification of the third embodiment described above, the control part 60 retries execution of processing of step 120 and subsequent steps when it is determined that the switch 11 (12) did not actually turn of As a result, similarly to the first embodiment, it is possible to shorten the time interval required for switchover from the state that the load 3 is connected to one of the two power supply sources, that is, the power supply system 5 and the secondary battery 2a, to the state that the load 3 is connected to the other of the two power supply sources.

[Third Modification of Third Embodiment]

In the first embodiment, the switch 11 (12) is turned off at the turn-off time point of different phase at each execution of step 101. Alternatively, according to a third modification of the third embodiment, the turn-off time point of the switch 11 (12) is determined based on the load current.

The first switching processing and the second switching processing will be described next separately.

(First Switching Processing)

Figure 15:
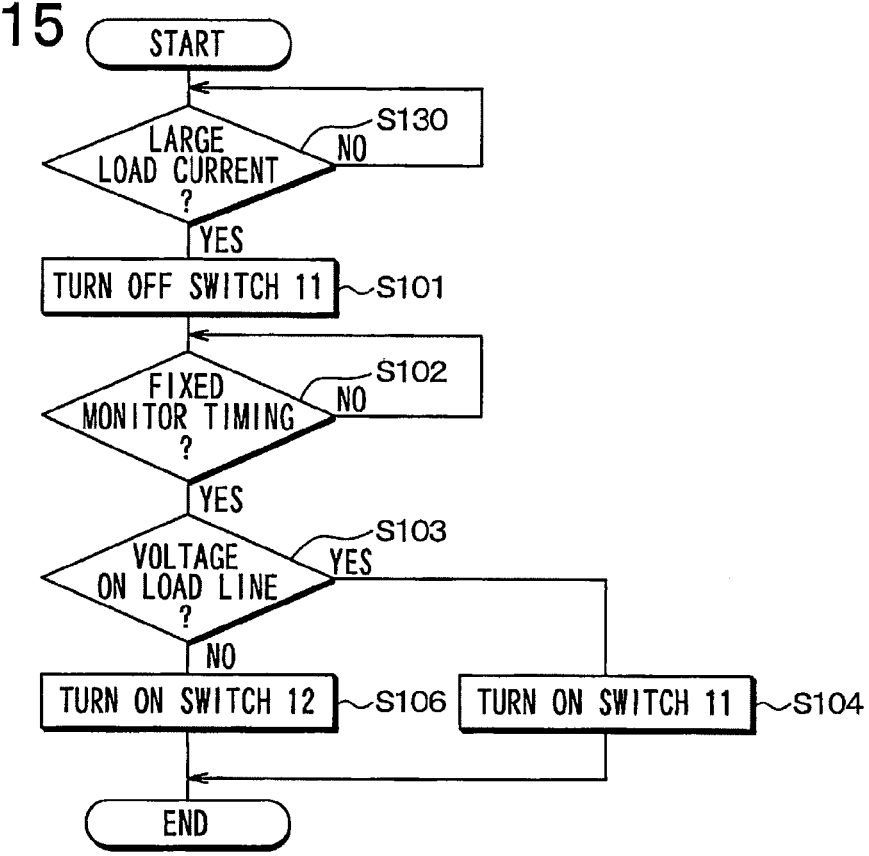
FIG. 15 is a flowchart showing switching processing executed by a control part according to a third modification of the third embodiment.
Figure 16:
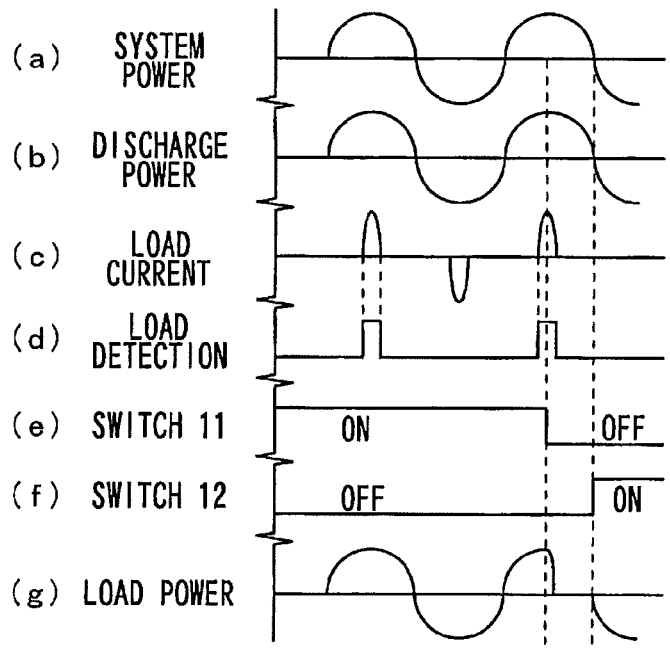
FIG. 16 is a time chart showing the switching processing executed by the control part according to the third modification of the third embodiment.

FIG. 15 is a flowchart showing the first switching processing executed by the control part 60. FIG. 16 is a flowchart, in which (a) shows the system power, (b) shows the discharge power, (c) shows the load current, (d) shows the load state detection, (e) shows the on/off of the switch 11, (f) shows the on/off of the switch 12, and (g) shows the load power.

In the flowchart of FIG. 15, step 130 is provided in place of steps 100 and 105 provided in FIG. 2. It is checked at step 130 whether the load current is equal to or larger than the predetermined value based on the monitor result of the load detection part 20. When YES is outputted at step 130 indicating that the load current is equal to or larger than the predetermined value, the switch 11 is turned off at step 101. Thus YES is outputted at step 102 indicating that the present time reached the monitor time point. Then YES is outputted to indicate that the AC voltage is developed on the load line 4. At step 104, the switch 11 is turned on. Then step 130 and subsequent steps are executed. NO is outputted at step 103 indicating that the AC voltage is not developed as the AC voltage on the load line 4 as a result of the AC voltage of the load line 4 monitored by the load detection part 20. Then the switch 12 is turned on at step 106.

(Second Switching Processing)

The control part 60 executes the second switching processing as shown in FIG. 15.

The second switching processing is substantially the same as the first switching processing except that the switch 12 is turned off at step 101, the switch 11 is turned on at step 106 and the switch 12 is turned on at step 104. Therefore the second switching processing will not be described below.

According to the third modification of the third embodiment described above, the turn-off time point of the switch 11 (12) is determined based on the monitor result of the load current by the load detection part 20 and the switch 11 (12) is turned off at the determined turn-off time point. When it is determined at step 103 that the switch 11 (12) did not actually turn off, the switch 11 (12) is turned on at step 104 and the execution of processing of step 120 and subsequent steps is retried. As a result, similarly to the first embodiment, it is possible to shorten the time interval required for switchover from the state that the load 3 is connected to one of the two power supply sources, that is, the power supply system 5 and the secondary battery 2a, to the state that the load 3 is connected to the other of the two power supply sources.

[Fourth Modification of Third Embodiment]

In the first embodiment, the switch 11 (12) is determined to be turned on or not based on whether the AC voltage is developed on the load line 4. Alternatively, according to a fourth modification of the third embodiment, the switch 11 (12) is determined to be turned on or not based on a level of the AC voltage of the load line 4 (referred to as load voltage below).

The first switching processing and the second switching processing in the fourth modification of the third embodiment will be described next separately.

(First Switching Processing)

Figure 17:
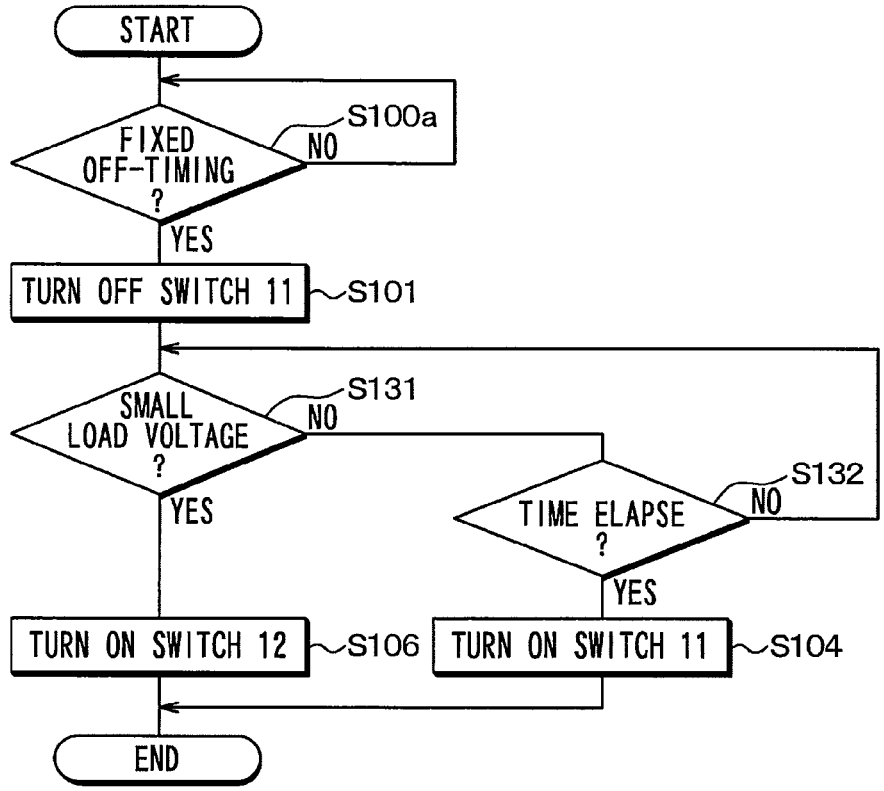
FIG. 17 is a flowchart showing switching processing executed by a control part according to a fourth modification of the third embodiment.
Figure 18:
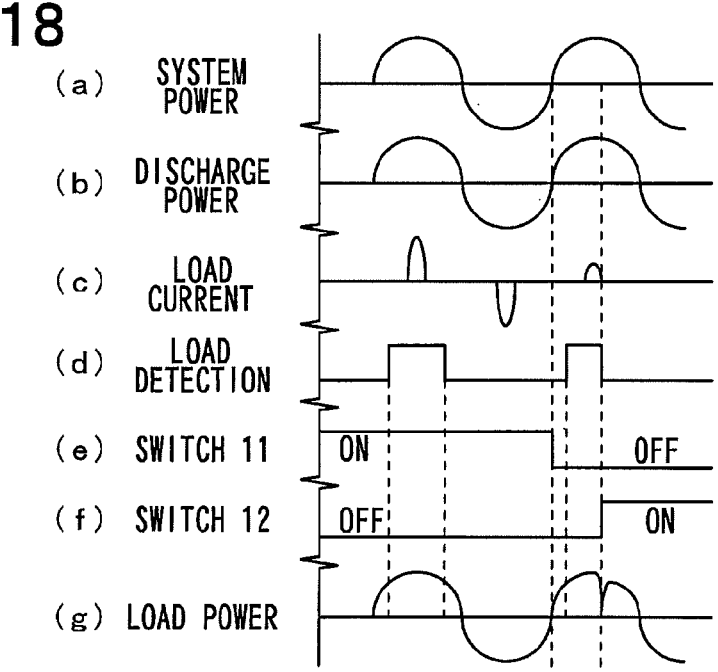
FIG. 18 is a time chart showing the switching processing executed by the control part according to the fourth modification of the third embodiment.

FIG. 17 is a flowchart showing the first switching processing executed by the control part 60. FIG. 18 is a flowchart, in which (a) shows the system power, (b) shows the discharge power, (c) shows the load current, (d) shows the load state detection (load voltage detection), (e) shows the on/off of the switch 11, (f) shows the on/off of the switch 12, and (g) shows the load power. In the flowchart of FIG. 17, steps 131 and 132 are provided in place of step 103 provided in FIG. 4.

It is checked at step 131 whether an absolute value of the load voltage is equal to or smaller than a predetermined value based on the monitor result of the load voltage by the load detection part 20. It is checked at step 132 whether elapse time after first determining NO at step 131 is equal to or longer than a predetermined time interval.

In the first switching processing, when it is determined to be YES at step 100a indicating that the present time reached the turn-off time point, the switch 11 is turned off at step 101. Then at step 131, NO is outputted to indicate that the absolute value of the load voltage is equal to or larger than the predetermined value, based on the monitor result of the load detection part 20. Then it is checked at step 132 whether the elapse time measured after first determining NO at step 131 is equal to or longer than the predetermined time interval. When the elapse time is shorter than the predetermined time interval, NO is outputted at step 132 and step 131 is executed. For this reason, as far as the absolute value of the load voltage value is larger than the predetermined value and the elapse time is shorter than the predetermined time interval, step 131 and step 132 repeat outputting NO. When the elapse time reaches the predetermined time interval, YES is outputted at step 132. The switch 11 is turned on at step 104 and step 100a and subsequent steps are repeated. When the absolute value of the load voltage becomes smaller than the predetermined value, YES is outputted at step 131 and the switch 12 is turned on at step 106. That is, the time point of turning on the switch 12 is determined based on the monitor result of the load voltage by the load detection part 20 and the switch 12 is turned on at the determined turn-on time point.

(Second Switching Processing)

The control part 60 executes the second switching processing as shown in FIG. 17. The second switching processing is substantially the same as the first switching processing except that the switch 12 is turned off at step 101, the switch 11 is turned on at step 106 and the switch 12 is turned on at step 104. Therefore the second switching processing will not be described below.

According to the fourth modification of the third embodiment described above, when it is determined that the switch 11 (12) did not actually turn off, the execution of processing of step 100a and subsequent steps is retried. As a result, similarly to the first embodiment, it is possible to shorten the time interval required for switchover from the state that the load 3 is connected to one of the two power supply sources, that is, the power supply system 5 and the secondary battery 2a, to the state that the load 3 is connected to the other of the two power supply sources.

[Fifth Modification of Third Embodiment]

According to a fifth modification of the third embodiment, the third modification and the fourth modification of the third embodiment are combined so that the turn-off time point of the switch 11 (12) is determined based on the load current and the switch 11 (12) is turned on based on the load current.

The first switching processing and the second switching processing in the fifth modification will be described next separately.

(First Switching Processing)

Figure 19:
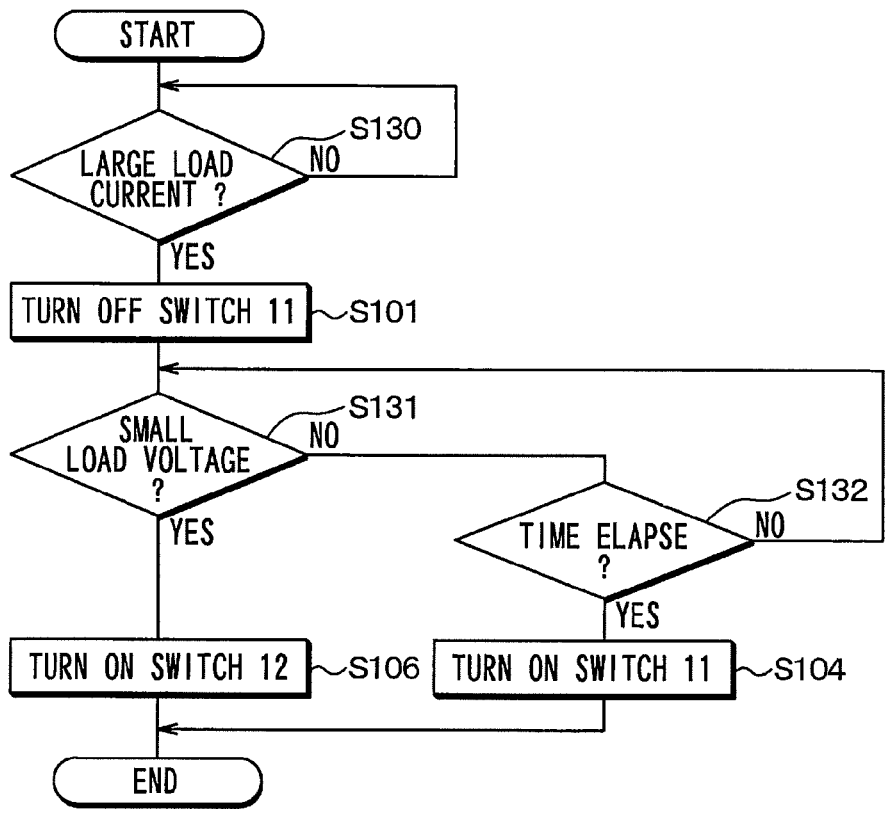
FIG. 19 is a flowchart showing switching processing executed by a control part according to a fifth modification of the third embodiment.
Figure 20:
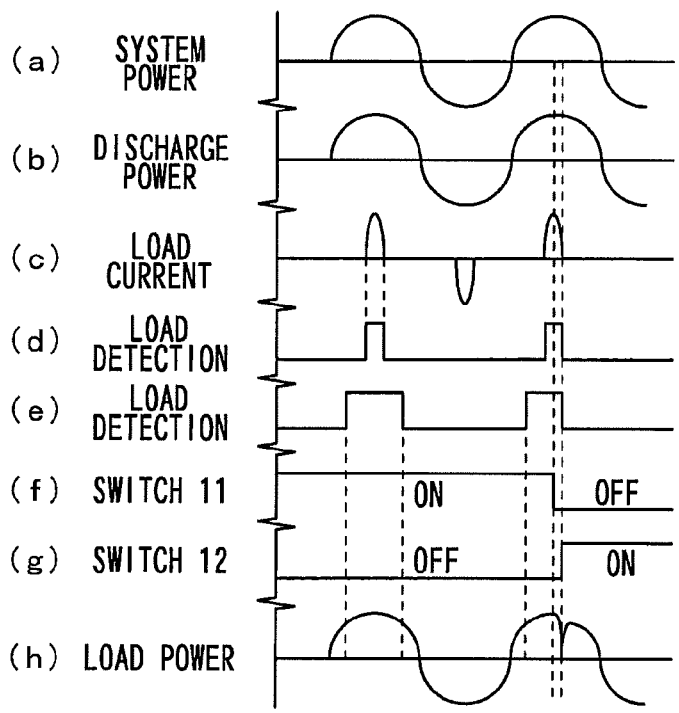
FIG. 20 is a time chart showing the switching processing executed by the control part according to the fifth modification of the third embodiment.

FIG. 19 is a flowchart showing the first switching processing executed by the control part 60. FIG. 20 is a time chart, in which (a) shows the system power, (b) shows the discharge power, (c) shows the load current, (d) shows the load state detection (load current detection), (e) shows the on/off of the switch 11, (f) shows the on/off of the switch 12, and (g) shows the load power.

In the flowchart of FIG. 19, steps 131 and 132 are provided in place of steps 102 and 103 provided in FIG. 15, respectively. Steps 131 and 132 are similar to steps 131 and 132 in the fourth modification. That is, the time point of turning off the switch 11 is determined based on the monitor result of the load current by the load detection part 20 and the switch 11 is turned off at the determined turn-off time point. The time point of turning on the switch 12 is determined based on the monitor result of the load voltage by the load detection part 20 and the switch 12 is turned on at the determined turn-on time point.

(Second Switching Processing)

The control part 60 executes the second switching processing as shown in FIG. 19. The second switching processing is substantially the same as the first switching processing except that the switch 12 is turned off at step 101, the switch 11 is turned on at step 106 and the switch 12 is turned on at step 104. Therefore the second switching processing will not be described below.

According to the fifth modification of the third embodiment described above, when it is determined that the switch 11 (12) did not actually turn off, the execution of processing of step 130 and subsequent steps is retried. As a result, similarly to the first embodiment, it is possible to shorten the time interval required for switchover from the state that the load 3 is connected to one of the two power supply sources, that is, the power supply system 5 and the secondary battery 2a, to the state that the load 3 is connected to the other of the power supply sources.

Fourth Embodiment

According to a fourth embodiment, execution of the processing of steps 100, 101 and so forth in the first embodiment is prohibited from being retried when failure arises. The first switching processing and the second switching processing in the fourth embodiment will be described next separately.

(First Switching Processing)

The control part 60 executes the first switching processing based on a flowchart shown in FIG. 21. In the flowchart of FIG. 21, steps 140, 141 and 142 are added to the steps in FIG. 2. It is checked at step 140 whether the load current flows in the load line 4 at the time point of turning off the switch 11 at step 101 based on the monitor result of the load detection part 20, that is, whether the load current flowing in the load line 4 is zero. That is, the load detection part 20 is caused to monitor the load current flowing in the load line 4 at time when the switch 11 is turned off at step 101. At step 141, retrial of the processing of step 100 and subsequent steps is stopped. At step 142, the display part 30 displays a notification that the retrial of the processing of step 100 and subsequent steps is stopped.

In the first switching processing, the switch 11 is turned off after outputting YES at step 100. At this turn-off time point, the load detection part 20 is caused to monitor the load current flowing in the load line 4. Then, after executing step 102, step 103 (YES) and step 104, YES is outputted at step 140 to indicate that the load current does not flow in the load line 4 at the turn-off time point of the switch 11 based on the monitor result of load line 4 by the load detection part 20. This determination indicates that the switching part 10, the load 3 and the like are normal. Thus processing of step 105 is finished. NO is outputted at step 140 to indicate that the load current flows in the load line 4 at the turn-off time point of the switch 11 based on the monitor result of load line 4 by the load detection part 20. This determination indicates that the switching part 10, the load 3 and the like are abnormal. Thus at step 141 the retrial of execution of the processing of step 100 and the subsequent steps is stopped. At next step 142, the display part 30 displays a notification that the retrial of the processing of step 100 and subsequent steps is stopped.

(Second Switching Processing)

The control part 60 executes the second switching processing as shown in FIG. 21. The second switching processing is substantially the same as the first switching processing except that the switch 12 is turned off at step 101, the switch 11 is turned on at step 106 and the switch 12 is turned on at step 104. Therefore the second switching processing will not be described below.

According to the fourth embodiment described above, when it is determined by the control part 60 that the switch 11 (12) did not actually turn off, the execution of processing of step 100 and subsequent steps is retried. As a result, similarly to the first embodiment, it is possible to shorten the time interval required for switchover from the state that the load 3 is connected to one of the two power supply sources, that is, the power supply system 5 and the secondary battery 2*a*, to the state that the load 3 is connected to the other of the two power supply sources.

According to the fourth embodiment, when the load current flows in the load line 4 at the turn-off time point of the switch 11 and the AC voltage is on the load line 4 after turning off the switch 11, the execution of the first switching processing is stopped. According to the fourth embodiment, when the load current flows in the load line 4 at the turn-off time point of the switch 12 and the AC voltage is on the load line 4 after turning off the switch 12, the execution of the second switching processing is stopped. Thus, the first and the second switching processing can be stopped when abnormality arises in the switching part 10, the load 3 and the like.

Fifth Embodiment

According to a fifth embodiment, the monitor time point is set to a zero-crossing time point of the AC power in the first embodiment.

The first switching processing and the second switching processing in the present embodiment will be described next separately.

(First Switching Processing)

Figure 22A:
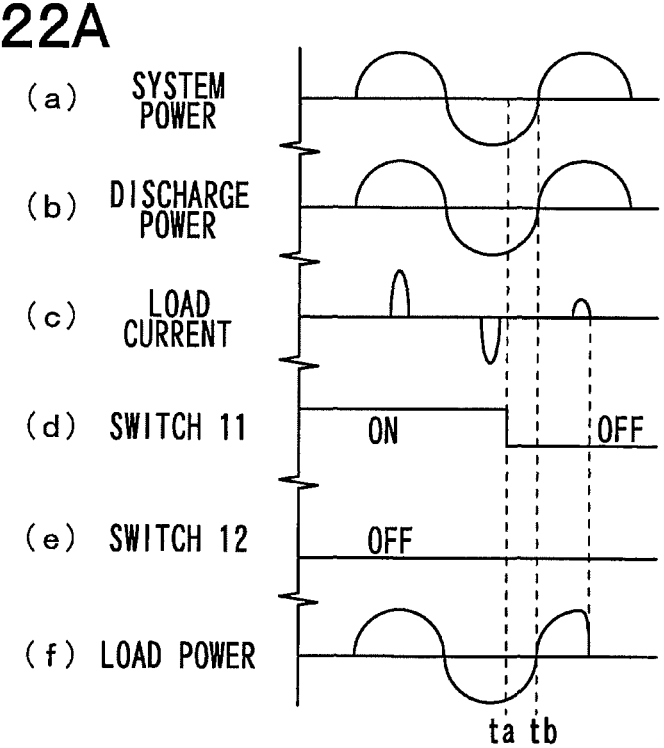
FIG. 22A and FIG. 22B are time charts showing switching processing executed by a control part according to a fifth embodiment.
Figure 22B:
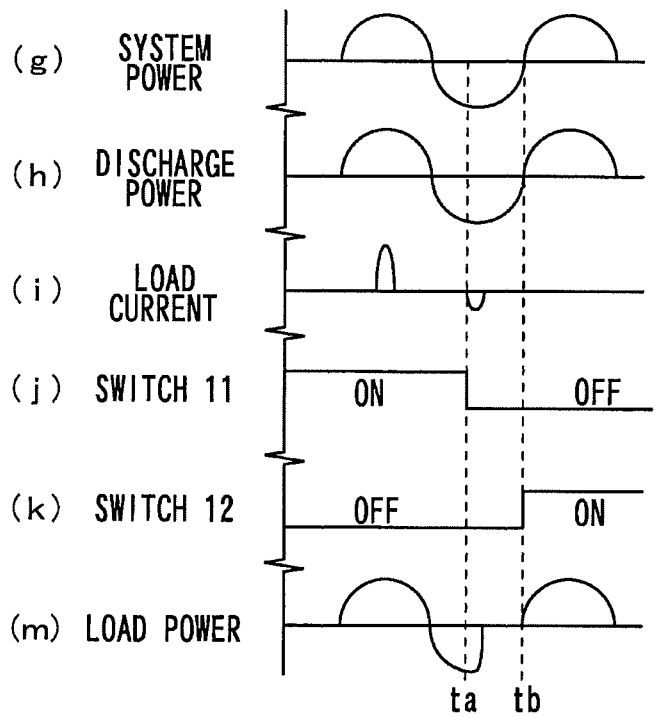

FIG. 22A and FIG. 22B are time charts, in which (a) to (m) correspond to (a) to (m) in FIG. 3. FIG. 22A and FIG. 22B show the system power, the discharge power, the load current, the on/off of the switches 11 and 12, and the load power.

The fifth embodiment differs from the first embodiment in the monitor time point at step 103 in FIG. 2. The monitor time point in the fifth embodiment is the same phase at each execution of step 103 and the zero-crossing time point of the discharge power. The zero-crossing time point of the discharge power is the time point at which the absolute value of the discharge power is equal to or lower than a predetermined value. For this reason, at step 103, the load detection part 20 monitors the AC voltage on the load line 4 at the zero-crossing time point and it is checked whether the AC voltage is developed on the load line 4 based on the monitor result. Thus it is checked whether the switch 11 actually turned off. Then NO is outputted to indicate that the AC voltage is not developed on the load line 4 and the switch 11 actually turned off. The switch 12 is turned on at the zero-crossing time point at step 106. The fifth embodiment executes its processing in the same manner as the first embodiment except for steps 103 and 106.

(Second Switching Processing)

The fifth embodiment differs from the first embodiment in the monitor time point at step 103 in FIG. 2. The monitor time point in the fifth embodiment is the same phase at each execution of step 103 and the zero-crossing time point of the system power. The zero-crossing time point of the system power is the time point at which the absolute value of the system power is equal to or lower than a predetermined value. The fifth embodiment executes its processing in the same manner as the first embodiment except for steps 103 and 106.

According to the fifth embodiment described above, the control part 60 retries step 100 and subsequent steps when it is determined that the switch 11 (12) did not actually turn off. As a result, similarly to the first embodiment, it is possible to shorten the time interval required for switchover from the state that the load 3 is connected to one of the two power supply sources, that is, the power supply system 5 and the secondary battery 2*a*, to the state that the load 3 is connected to the other of the two power supply sources.

According to the fifth embodiment, the monitor time point is set to the zero-crossing time point of the discharge power (system power). For this reason, the time point for turning on the switch 12 (11) at step 106 becomes the zero-crossing time point of the discharge power (system power). As a result, by turning on the switch 12 (11), the power supply system 5 and the load 3 are protected from being adversely affected.

[First Modification of Fifth Embodiment]

According to a first modification of the fifth embodiment, the turn-off time point of the switch 11 (12) is set to the time point of zero-crossing of the AC power in the first modification of the first embodiment.

The first switching processing and the second switching processing in the present embodiment will be described next separately.

(First Switching Processing)

Figure 23A:
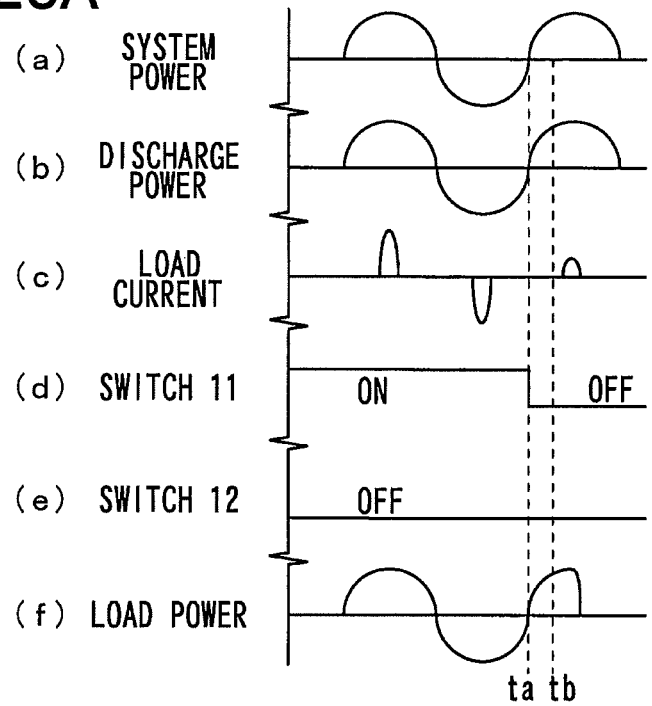
FIG. 23A and FIG. 23B are time charts showing switching processing executed by a control part according to a first modification of the fifth embodiment.
Figure 23B:
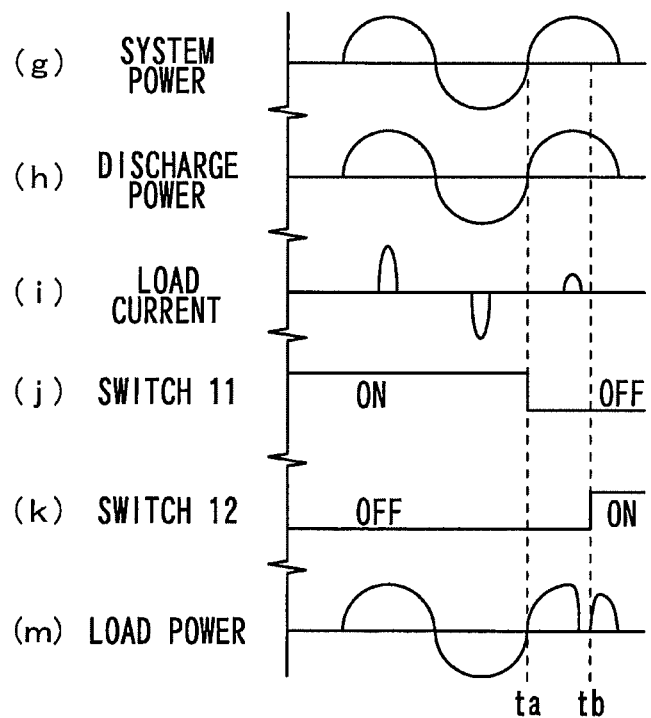
Figure 24:
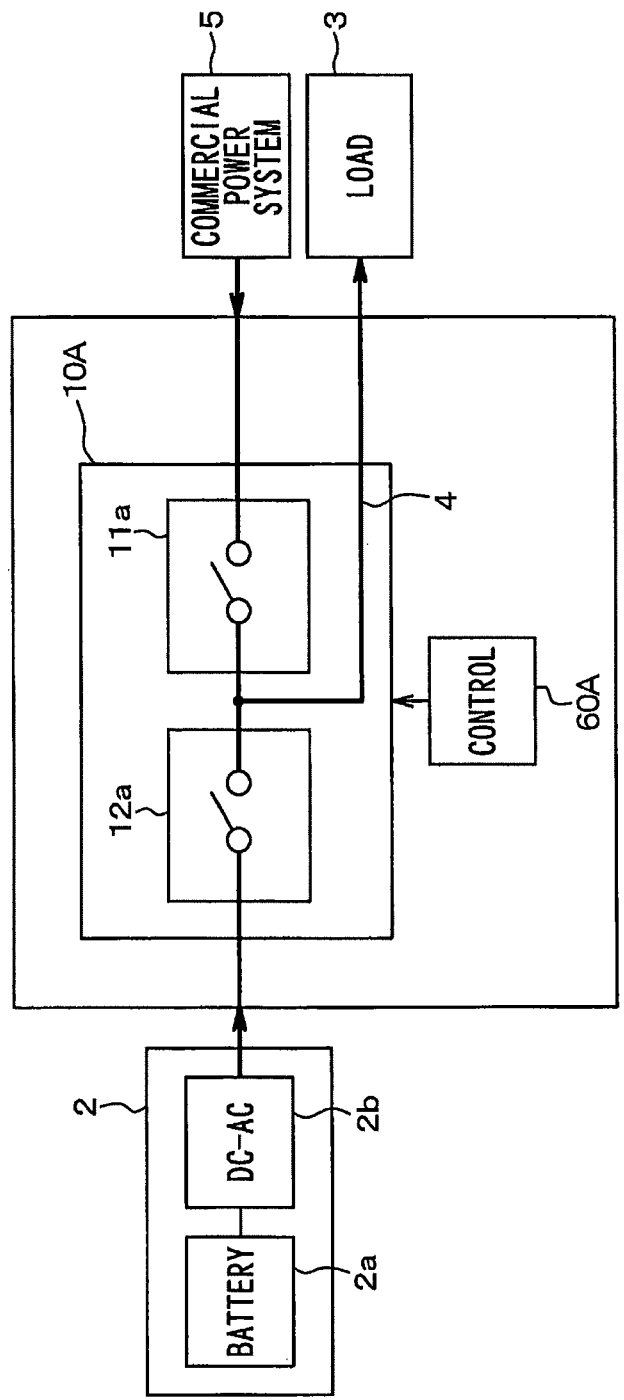
FIG. 24 is an electric circuit diagram showing an AC power supply source switching apparatus according to a comparative example.

FIG. 23A and FIG. 23B are time charts, in which (a) to (m) correspond to (a) to (m) in FIG. 5. FIG. 23A and FIG. 23B show the system power, the discharge power, the load current, the on/off of the switches 11 and 12, and the load power.

The first modification of the fifth embodiment differs from the first modification of the first embodiment in the turn-off time point of the switch 11 at step 101 in FIG. 4. The turn-off time point of the switch 11 in this modification is the same phase at each execution of step 101 and the zero-crossing time point at which the discharge power becomes zero. The zero-crossing time point of the system power is the time point at which the absolute value of the system power is equal to or lower than the predetermined value. The first modification of the fifth embodiment executes its processing in the same manner as the first modification of the first embodiment except for step 101 for turning on the switch 11.

(Second Switching Processing)

The first modification of the fifth embodiment differs from the first modification of the first embodiment in the turn-off time point of the switch 12 at step 101 in FIG. 4. The turn-off time point in this modification is the same phase at each execution of step 101 and the zero-crossing time point at which the discharge power becomes zero. The zero-crossing time point of the discharge power is the time point at which the absolute value of the discharge power is equal to or lower than the predetermined value. The first modification of the fifth embodiment executes its processing in the same manner as the first modification of the first embodiment except for step 101, by which the switch 12 is turned off.

According to the first modification of the fifth embodiment described above, the control part 60 executes the processing of step 100 and subsequent steps again when it is determined that the switch 11 (12) did not actually turn off. As a result, similarly to the first modification of the first embodiment, it is possible to shorten the time interval required for switchover from the state that the load 3 is connected to one of the two power supply sources, that is, power supply system 5 and the secondary battery 2*a*, to the state that the load 3 is connected to the other of the two power supply sources.

According to the first modification of the fifth embodiment, the turn-off time point of the switch 11 (12) is set to the zero-crossing time point of the system power (discharge power). As a result, by turning off the switch 11 (12), the power supply system 5 and the load 3 are protected from being adversely affected.

Other Embodiment

In the first to the fifth embodiments, it is checked whether the switch 11 (12) actually turned off as instructed by the control part 60 by checking whether the AC voltage is developed on the load line 4. Alternatively, it may be checked whether the switch 11 (12) actually turned off as instructed by the control part 60 by checking whether the absolute value of the AC voltage is lower than the predetermined value.

In the first embodiment, the time interval T between the turn-off time point ta of (N+1)th step 101 and the monitor time point tb of (N+1)th step 103 is set longer than the time interval T between the turn-off time point ta of Nth step 101 and the monitor time point tb of Nth step 103. Alternatively, it may be changed as follows.

The time interval T between the turn-off time point ta of Nth step 101 and the monitor time point tb of Nth step 103 is set to equal the time interval T between the turn-off time point ta of (N+1)th step 101 and the monitor time point tb of (N+1)th step 103.

Similarly, also in the first modification of the first embodiment, the time interval T between the turn-off time point ta of Nth step 101 and the monitor time point tb of Nth step 103 may be set to equal the time interval T between the turn-off time point ta of (N+1)th step 101 and the monitor time point tb of (N+1)th step 103.

In the second modification of the first embodiment, the time interval T between the turn-off time point ta of Nth step 101 and the monitor time point tb of Nth step 103 is set to equal the time interval T between the turn-off time point ta of (N+1)th step 101 and the monitor time point tb of (N+1)th step 103. Alternatively, it may be changed as follows.

That is, the time interval T between the turn-off time point ta of (N+1)th step 101 and the monitor time point tb of (N+1)th step 103 is set longer than the time interval T between the turn-off time point ta of Nth step 101 and the monitor time point tb of Nth step 103.

In the first to the fifth embodiments, the secondary battery 2a is used and mounted on the electric vehicle. Alternatively, a secondary battery installed on the ground may be used as the secondary battery 2a.

In the first to the fifth embodiments, the power supply system 5 and the DC-AC conversion device 2b supply two-phase AC power. Alternatively, the power supply system 5 and the DC-AC conversion device 2b may supply AC power of three or more phases.

In the first to the fifth embodiments, the control part 60 executes both the first switching processing and the second switching processing. Alternatively, the control part 60 may execute either one of the first switching processing and the second switching processing only.

In the first to the fifth embodiments, the system power supplied from the power supply system 5 and the discharge power supplied from the DC-AC conversion device 2b are assumed to be synchronized. Alternatively, the system power supplied from the power supply system 5 and the discharge power supplied from the DC-AC conversion device 2b need not be synchronized.

The monitor time point is set to the zero-crossing time point in the fifth embodiment, and the turn-off time point of the switch 11 (12) is set to the zero-crossing time point in the first modification of the fifth embodiment. Alternatively, the monitor time point may be set to the zero-crossing time point and the turn-off time point of the switch 11 (12) is set to the zero-crossing time point. In this case, similarly to the first embodiment, the time interval T between the turn-off time point ta of (N+1)th step 101 and the monitor time point tb of (N+1)th step 103 may be set longer than the time interval T between the turn-off time point ta of Nth step 101 and the monitor time point tb of Nth step 103.

The AC power supply source switching apparatus is not limited to the disclosed embodiments but may be implemented in further different embodiments. The first to the fifth embodiments and the modifications thereof are not irrelevant one another. Those embodiments and modifications may be combined suitably unless such a combination is never possible.

In the first to the fifth embodiments and the modifications thereof, one of the switch 11 and the switch 12 corresponds to a first switch. The other of the switch 11 and the switch 12 corresponds to a second switch. Steps 100 and 101 correspond to a first control section. Steps 103 and 131 correspond to a check section. Step 106 corresponds to a second section. Steps 109 and 142 correspond to a notification section. Step 121, 122 and 123 correspond to a determination section.

What is claimed is:

1. An AC power source switching apparatus for selectively switching over power supply to a load from two power supply sources, which includes a power supply system for supplying system power as AC power and a DC-AC conversion part for converting output power of a secondary battery to AC power, the AC power source switching apparatus comprising:
   a first switch interposed between a load and one of the two power supply sources;
   a second switch interposed between the load and an other of the two power supply sources; and
   a switching control part for controlling the first switch and the second switch,
   wherein the switching control part includes:
   a first control section for turning off the first switch at a time of switchover from a first state that the load is connected to one of the two power supply sources to a second state that the load is connected to the other of the two power supply sources;
   a check section for checking whether the first switch actually turned off after the control section turned off the first switch;
   a second control section for turning on the second switch after the check section determines that the first switch actually turned off,
   at least one of the first control section and the check section operating again when the check section determines that the first switch did not actually turn off, wherein
   the switching control part makes a time interval, which is from turning off of the first switch to a determination of the check section, longer when the first control section and a first determination of the check section operate again than that of previous operations of the first control section and the check section.

2. The AC power source switching apparatus according to claim 1, wherein:
   the at least one of the first control section and check section operates again at a time point, which is different in phase of the AC power from a previous time point of operation, when check section determines that the first switch did not actually turn off.

3. The AC power source switching apparatus according to claim 1, further comprising:
   a voltage detection part for monitoring an AC voltage on a load line;
   wherein the switching control part determines a time point of turning on the second switch based on a monitor result of the voltage detection part and the second control section turns on the second switch at a determined time point.

4. The AC power source switching apparatus according to claim 1, wherein:
the switching control part checks whether a load current flows in a load line and causes an AC voltage to develop on the load line as an abnormality at a time point of turning off the first switch by the first control section, and stops the switchover from the first state to the second state.

5. The AC power source switching apparatus according to claim 4, wherein the switching control section includes:
a notification section for notifying externally of stopping of the switchover from the first state to the second state.

6. An AC power source switching apparatus for selectively switching over power supply to a load from two power supply sources, which includes a power supply system for supplying system power as AC power and a DC-AC conversion part for converting output power of a secondary battery to AC power, the AC power source switching apparatus comprising:
a first switch interposed between a load and one of the two power supply sources;
a second switch interposed between the load and an other of the two power supply sources; and
a switching control part for controlling the first switch and the second switch,
wherein the switching control part includes:
a first control section for turning off the first switch at a time of switchover from a first state that the load is connected to one of the two power supply sources to a second state that the load is connected to the other of the two power supply sources;
a check section for checking whether the first switch actually turned off after the control section turned off the first switch;
a second control section for turning on the second switch after the check section determines that the first switch actually turned off,
at least one of the first control section and the check section operating again when the check section determines that the first switch did not actually turn off, and
a voltage detection part for monitoring an AC voltage of a load line, which connects the load to the first switch and the second switch,
wherein the voltage detection part monitors the AC voltage of the load line after the first control section turned off the first switch,
the check section determines that the first switch actually turned off, when a monitor result of the voltage detection part indicates that the AC voltage is not developed on the load line, the switching control part includes a determination section for acquiring a pattern of a load current, which flows in the load line, and determining a time point of operation of the at least one of the first control section and check section based on an acquired pattern of the load current.

7. An AC power source switching apparatus for selectively switching over power supply to a load from two power supply sources, which includes a power supply system for supplying system power as AC power and a DC-AC conversion part for converting output power of a secondary battery to AC power, the AC power source switching apparatus comprising:
a first switch interposed between a load and one of the two power supply sources;
a second switch interposed between the load and an other of the two power supply sources; and
a switching control part for controlling the first switch and the second switch,
wherein the switching control part includes:
a first control section for turning off the first switch at a time of switchover from a first state that the load is connected to one of the two power supply sources to a second state that the load is connected to the other of the two power supply sources;
a check section for checking whether the first switch actually turned off after the control section turned off the first switch;
the first control section and check section repeat respective operations as far as check section continues to determine that the first switch did not actually turn off, until a number of times check section determines that the first switch did not actually turn off reaches a predetermined value,
a second control section for turning on the second switch after the check section determines that the first switch actually turned off,
at least one of the first control section and the check section operating again when the check section determines that the first switch did not actually turn off.

8. The AC power source switching apparatus according to claim 7, wherein:
the switching control part stops switchover from the first state to the second state, when the number of times the check section determines that the first switch did not actually turn off reaches the predetermined value.

9. The AC power source switching apparatus according to claim 8, wherein the switching control part includes:
a notification section for notifying externally of stopping of the switchover from the first state to the second state, when the switchover from the first state to the second state is stopped.

10. An AC power source switching apparatus for selectively switching over power supply to a load from two power supply sources, which includes a power supply system for supplying system power as AC power and a DC-AC conversion part for converting output power of a secondary battery to AC power, the AC power source switching apparatus comprising:
a first switch interposed between a load and one of the two power supply sources;
a second switch interposed between the load and an other of the two power supply sources; and
a switching control part for controlling the first switch and the second switch,
wherein the switching control part includes:
a first control section for turning off the first switch at a time of switchover from a first state that the load is connected to one of the two power supply sources to a second state that the load is connected to the other of the two power supply sources;
a check section for checking whether the first switch actually turned off after the control section turned off the first switch;
a second control section for turning on the second switch after the check section determines that the first switch actually turned off,
at least one of the first control section and the check section operating again when the check section determines that the first switch did not actually turn off, and a voltage detection part for monitoring an AC voltage of a load line, which connects the load to the first switch and the second switch, wherein the voltage detection part monitors the AC voltage of the load line after the first control section turned off the first switch, the check section determines that the first switch actually turned off, when a monitor result of the voltage detection part indicates that the AC voltage is not developed on the load line, and a current detection part for monitoring a load current flowing in the load line, wherein the switching control part determines a time point of turning off the first switch based on a monitor result of the current detection part, and the first control section turns off the first switch at a determined time point.

11. An AC power source switching apparatus for selectively switching over power supply to a load from two power supply sources, which includes a power supply system for supplying system power as AC power and a DC-AC conversion part for converting output power of a secondary battery to AC power, the AC power source switching apparatus comprising:

a first switch interposed between a load and one of the two power supply sources;

a second switch interposed between the load and an other of the two power supply sources;

a power detection part for monitoring the AC power supplied to the load through a load line; and a switching control part for controlling the first switch and the second switch, wherein the switching control part includes:

a first control section for turning off the first switch at a time of switchover from a first state that the load is connected to one of the two power supply sources to a second state that the load is connected to the other of the two power supply sources;

a check section for checking whether the first switch actually turned off after the control section turned off the first switch;

a second control section for turning on the second switch after the check section determines that the first switch actually turned off, at least one of the first control section and the check section operating again when the check section determines that the first switch did not actually turn off, the first control section and the check section operate again, the first control section operating again at a time point different in phase of the AC power from a time point of previous operation of the first control section, when the check section determines that the first switch did not actually turn off, and the second control section turns on the second switch at a time point of zero-crossing of the AC power based on a monitor result of the power detection part, when the check section determines that the first switch actually turned off.

12. An AC power source switching apparatus for selectively switching over power supply to a load from two power supply sources, which includes a power supply system for supplying system power as AC power and a DC-AC conversion part for converting output power of a secondary battery to AC power, the AC power source switching apparatus comprising:

a first switch interposed between a load and one of the two power supply sources;

a second switch interposed between the load and an other of the two power supply sources;

a power detection part for monitoring the AC power supplied to the load through a load line; and a switching control part for controlling the first switch and the second switch, wherein the switching control part includes:

a first control section for turning off the first switch at a time of switchover from a first state that the load is connected to one of the two power supply sources to a second state that the load is connected to the other of the two power supply sources;

a check section for checking whether the first switch actually turned off after the control section turned off the first switch, a second control section for turning on the second switch after the check section determines that the first switch actually turned off, at least one of the first control section and the check section operating again when the check section determines that the first switch did not actually turn off, and the check section operates again at a time point different in phase from a previous time point of operation of the check section when the check section determines that the first switch did not actually turn off, and the first control section turns off the first switch at a time point of zero-crossing of the AC power based on a monitor result of the power detection part when the check section determines that the first switch actually turned off.

* * * * *